US007228318B2

(12) United States Patent
Li et al.

(10) Patent No.: US 7,228,318 B2
(45) Date of Patent: Jun. 5, 2007

(54) SYSTEM AND METHODS FOR INVALIDATION TO ENABLE CACHING OF DYNAMICALLY GENERATED CONTENT

(75) Inventors: Wen-Syan Li, Fremont, CA (US); Kasim Selcuk Candan, Tempe, AZ (US); Divyakant Agrawal, Santa Barbara, CA (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/121,825

(22) Filed: May 4, 2005

(65) Prior Publication Data
US 2005/0192995 A1 Sep. 1, 2005

Related U.S. Application Data

(62) Division of application No. 10/084,630, filed on Feb. 26, 2002, now Pat. No. 6,889,234.

(60) Provisional application No. 60/271,461, filed on Feb. 26, 2001.

(51) Int. Cl.
*G06F 17/30* (2006.01)

(52) U.S. Cl. .............. 707/203; 707/2; 707/10; 707/100; 707/201; 709/226

(58) Field of Classification Search ............ 707/2, 707/3, 4, 9, 10, 104.1, 200, 201, 203; 709/203, 709/217, 219, 226, 244; 711/141, 144
See application file for complete search history.

(56) References Cited
U.S. PATENT DOCUMENTS

| | | | | |
|---|---|---|---|---|
| 4,432,057 A * | 2/1984 | Daniell et al. | ............ | 707/8 |
| 4,611,094 A | 9/1986 | Asmuth et al. | | |
| 4,807,182 A * | 2/1989 | Queen | ............ | 707/203 |
| 4,866,611 A * | 9/1989 | Cree et al. | ............ | 707/100 |
| 4,875,159 A * | 10/1989 | Cary et al. | ............ | 707/203 |
| 4,956,809 A * | 9/1990 | George et al. | ............ | 707/101 |
| 5,065,360 A * | 11/1991 | Kelly | ............ | 708/142 |
| 5,113,514 A * | 5/1992 | Albonesi et al. | ............ | 711/144 |
| 5,142,619 A * | 8/1992 | Webster, III | ............ | 715/803 |
| 5,187,787 A * | 2/1993 | Skeen et al. | ............ | 719/314 |
| 5,210,868 A * | 5/1993 | Shimada et al. | ............ | 707/5 |

(Continued)

OTHER PUBLICATIONS

Iyengar, Arun "Design and Performance of a General-Purpose Software Cache", 1999 IEEE, pp. 329-336.

(Continued)

*Primary Examiner*—Shahid Al Alam
(74) *Attorney, Agent, or Firm*—Foley & Lardner LLP

(57) ABSTRACT

Various systems and methods are describe for determining dynamically generated content to be invalidated as a result of changes to underlying data. In one method, invalidation processing is performed using a delayed version of the database that reflects the state of the database at the beginning of a preceding processing cycle, and an update log that reflects all updates since the beginning of the preceding processing cycle. In another method, invalidation processing is performed by locking a database which is locked during processing so as to reflect the state of the database at the beginning of processing, and an update log that reflects all updates to the database since the beginning of the preceding processing cycle. In another method, invalidation processing uses the database while it is freely updated during said processing, and the update log of the database.

16 Claims, 11 Drawing Sheets

U.S. PATENT DOCUMENTS

| | | | |
|---|---|---|---|
| 5,237,678 A * | 8/1993 | Kuechler et al. | 707/5 |
| 5,251,291 A * | 10/1993 | Malcolm | 715/539 |
| 5,272,628 A * | 12/1993 | Koss | 715/503 |
| 5,283,887 A * | 2/1994 | Zachery | 715/513 |
| 5,903,907 A * | 5/1999 | Hagersten et al. | 711/122 |
| 5,941,957 A | 8/1999 | Ingrassia et al. | |
| 5,951,643 A | 9/1999 | Shelton et al. | |
| 5,951,652 A | 9/1999 | Ingrassia et al. | |
| 5,954,798 A | 9/1999 | Shelton et al. | |
| 6,035,332 A | 3/2000 | Ingrassia et al. | |
| 6,094,709 A * | 7/2000 | Baylor et al. | 711/141 |
| 6,108,703 A | 8/2000 | Leighton et al. | |
| 6,490,575 B1 | 12/2002 | Berstis | |
| 6,748,447 B1 * | 6/2004 | Basani et al. | 709/244 |
| 6,748,498 B2 * | 6/2004 | Gharachorloo et al. | 711/141 |

OTHER PUBLICATIONS

Min, Sang Lyul et al., "Design and Analysis of a Scalable Cache Coherence Scheme Based on Clocks and Timestamps", IEEE Transaction on Parallel and Distributed Sstems, vol. 3, No. 1, Jan. 1992, pp. 25-44.

Jing, Jin et al., "Bit-Sequences: An Adaptive Cache Invalidation Method in Mobile Client/Server Environments", Mobile Networks and Applications, vol. 2, Issue 2, Oct. 1997, pp. 1-23.

Degenaro, Louis et al., "A Middleware System Which Intelligently Caches Query Results", ACM International Conference on Distributed Systems Platforms, New York, Apr. 4-7, 2000, pp. 1-22.

* cited by examiner

Data ←→ Queries ←→ Content

SYSTEM AND METHODS FOR INVALIDATION TO ENABLE CACHING OF DYNAMICALLY GENERATED CONTENT

This application is a division of application Ser. No. 10/084,630, filed Feb. 26, 2002, now U.S. Pat. No. 6,889,234, by Wen-Syan Li, Kasim Selcuk Candan and Divyakant Agrawal. This application claims only subject matter disclosed in the parent application and therefore presents no new matter.

RELATED APPLICATIONS

The application claims priority under 35 USC §119(e) from U.S. Provisional Patent Application 60/271,461, filed 26 Feb. 2001, the entirety of which is incorporated herein by reference.

BACKGROUND OF THE INVENTION

1. Field of the Invention

Embodiments of the invention may pertain to caching of dynamically generated content and invalidation of cached content.

2. Description of Related Art

Web performance is a key point of differentiation among content providers. Crashes and slowdowns within major web sites demonstrate the difficulties companies face in trying to deal with high web traffic. As Internet backbone technologies have developed, many innovations in the area of service management have improved bandwidth and web content retrieval response time. These improvements to infrastructure, however, cannot solve traffic problems at all points within the Internet.

For example, FIG. 1 shows an end user 1-1 in a network 1-2 in Japan who requests access to a page from a web site origin server 1-3 in a network 1-4 in the United States. This request must pass through several gateways 1-5, 1-6, and 1-7 before reaching the web site 1-3. Although the web site 1-3 may have the ability to rapidly communicate large quantities of data (i.e. large bandwidth), the gateways connecting the network 1-2 in Japan to the network 14 in the United States may be slow, and thus, when end user 1-1 attempts to access the page from web site 1-3, the gateways may create a bottleneck. Such gateway bottlenecks may result in the access time for one page of data being on the order of 10 seconds or more.

Recent development efforts in this field have focused on eliminating these delays. Architectures that address these problems are typically called content delivery networks (CDN). A key technology underlying all CDNs is the deployment of network-wide caches that replicate content held by the origin server in different parts of the network: front-end caches, proxy caches, edge caches, and so on. The basic premise of this architecture is that by replicating content, a user request for content may be served from a cache that is in the network proximity of the user, instead of routing it all the way to the origin server. There are several advantages of this approach. User requests are satisfied in more responsive manner due to lower network latency. Also, since requests are not routed the full distance from the user site to the origin server, significant bandwidth savings can be potentially realized. Origin servers can also be made more scalable due to load distribution, since network caches participate in serving user requests, and thus not all requests need to be served by the origin server.

One such architecture is the CachePortal™ system, described in pending U.S. patent application Ser. No. 09/545,805 entitled "System and Method for Efficient Content Delivery," filed Apr. 7, 2000, the contents of which are incorporated herein by reference. CachePortal™ employs mirror servers that are used as edge caches to provide content to end users with less network delay. CachePortal™ can distribute content among mirror servers as well as remove, refresh, or invalidate the content in the mirror servers. CachePortal™ can also modify the attributes of content in the mirror servers. For example, CachePortal™ may check whether an object has been updated. If CachePortal™ finds that it has not been updated, then CachePortal™ may change the value of the refresh time stamp or last modified date time stamp.

In general, current architectures restrict themselves to the caching of static content (e.g., image data, video data, audio data, etc.) or content that is updated relatively infrequently. The origin server and the caches have to rely on manual or hard-wired approaches for propagating updates to the caches in the latter case. In the space of web and Internet technologies, however, there is currently a shift from information-centric architectures to service-centric architectures. Web servers in this context are referred to as e-commerce servers. A typical e-commerce server architecture is illustrated in FIG. 2. The system consists of three major components: a database management system (DBMS) 2-2 that maintains information pertaining to a service, an application server (AS) 2-4 that encodes business logic pertaining to the organization, and a web server (WS) 2-6 that provides a web-based interface between the users and the e-commerce provider. A user request to such an e-commerce server invokes program scripts in the application server 2-4 that in turn issue queries to the underlying DBMS 2-2. The query results are then used to dynamically generate pages that are transmitted to the user by the web server 2-6.

Such e-commerce systems present new caching problems that arise from the need to prevent staleness of cached, dynamically generated content. As shown in FIG. 3, the data stored in the database has relationships to queries that have been made by the application server in response to content requests made by users. In particular, certain data in the database is responsive to each query. Queries in turn have relationships to instances of dynamically generated content that are stored in various caches. Therefore, a given change to the database affects related queries, and in turn affects cached results related to those queries.

To illustrate these caching problems, assume that an e-commerce application, AutoSale.com, runs in an architecture as shown in FIG. 2. Assume further that the database of this system includes two relations:

car(maker, model, price), and
mileage(model, EPA).

Thus, in response to a query that generates the application script:

select maker, model, price
from car
where maker = "Toyota"

the system produces a web page that lists the models and prices of all Toyota cars available in the inventory. The page is sent to the end user, and is also cached for future accesses in the front-end cache of the e-commerce site.

Assume now that after the dynamically generated web page has been stored in the front-end cache, a new tuple (Toyota, Avalon, 25000) is inserted into the relation car in the database. Because of this new insertion, the cached page no longer accurately reflects the results that would be provided by the database to the query that originally resulted in the generation of the page, since the newly inserted tuple is responsive to the query but is not reflected in the cached page. Therefore, a later user who presents the same request for information should not receive the cached page, since that page does not include all current price data that is responsive to the query. This situation will arise frequently in most e-commerce systems, since they typically store a large amount of inventory, catalog, and pricing data that is updated frequently.

Therefore, while it is desirable to cache dynamically generated pages because of the time and resources required to generate them, it is only practical to do so when their freshness can be ensured. One approach to this problem, similar to the database concept of "materialized views," would be to determine the cached content affected by each database update, and to regenerate each affected page and replace the out of date page in the cache. However, the resources required to implement this strategy may not be justified by the resources that are preserved by caching. Thus the conventional solution to this problem is to effectively prevent the caching of dynamically generated pages by tagging them as either non-cacheable or expire-immediately. As a result, every user request that requires a dynamically generated HTML page must be newly generated by the origin server, resulting in redundant processing in the application server and database server, as well as network roundtrip latency between the user and the e-commerce site.

SUMMARY OF THE INVENTION

In view of the aforementioned problems and considerations, it is an object of embodiments of the invention disclosed herein to improve the caching of dynamically generated content by providing a network component, referred to as an "invalidator," that monitors database updates and selectively invalidates cached content based on those updates by sending invalidation messages to caches where affected content is stored. Thus, if a query for invalidated content is received by the system, the content is regenerated rather than being supplied from the cache.

It is a further object of these embodiments to provide efficient invalidation techniques that invalidate cached results in a manner that imposes minimal overhead on the DBMS. It is another object of these embodiments to provide a component that may be used to augment a WS/AS/DBMS system of the type shown in FIG. 2 to enable caching of dynamically generated content produced by the system.

In accordance with the foregoing objectives, preferred embodiments utilize various processing schemes to process of queries received by a system to determine which of those queries is affected by updates to a database of the system and thus should be invalidated.

In one preferred embodiment, a system may implement a method in which invalidation processing is performed using a delayed version of the database that reflects the state of the database at the beginning of a preceding processing cycle, and an update log that reflects all updates since the beginning of the preceding processing cycle.

In another preferred embodiment, a system may implement a method in which invalidation processing is performed by locking a database which is locked during processing so as to reflect the state of the database at the beginning of processing, and an update log that reflects all updates to the database since the beginning of the preceding processing cycle.

In another preferred embodiment, a system may implement a method in which invalidation processing uses the database while it is freely updated during said processing, and the update log of the database.

DESCRIPTION OF THE DRAWINGS

The invention may be better understood with reference to the following figures. The components in the figures are not necessarily to scale, emphasis instead being placed upon illustrating the principles of the embodiments of invention described in conjunction therewith.

DETAILED DESCRIPTION OF PREFERRED EMBODIMENTS

In the following description, details of preferred embodiments and certain alternative embodiments in accordance with the invention are set forth. However, it will be apparent to those of ordinary skill in the art that alternative embodiments of the invention may be implemented using only some of the features of these embodiments, and using alternative combinations of the features of these embodiments. While various operations may be described herein in a particular order and as discrete tasks, the order of description should not be construed to imply that the tasks involved in those operations must be performed in the order in which they are presented or that those tasks must be performed discretely. Further, in some instances, well known features are omitted or generalized in order not to obscure the description. In this description, the use of phrases such as "an embodiment," "embodiments," "preferred embodiments," "alternative embodiment" and so forth do not necessarily refer to the same embodiment or all embodiments, although they may.

Overview

Figures 3, 4:
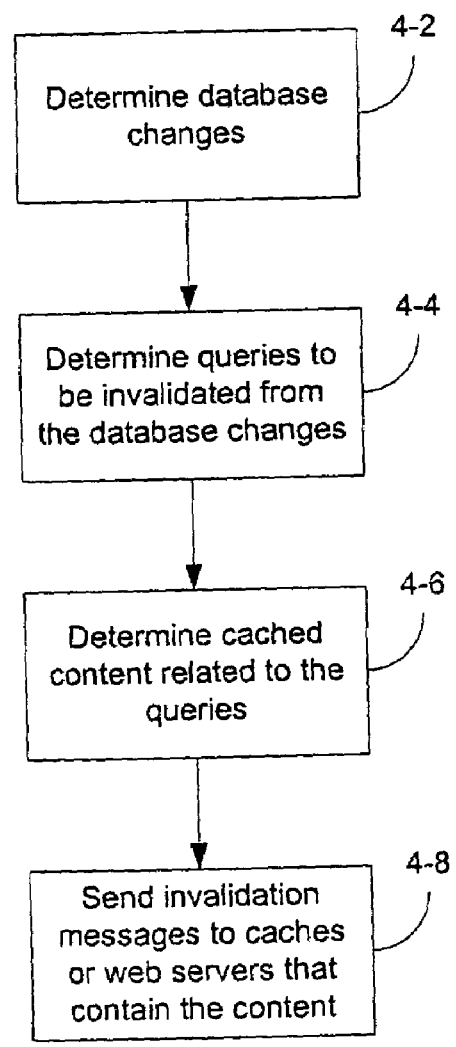
FIG. 3 shows relationships used to invalidate dynamically generated content.
FIG. 4 shows a basic content invalidation process.

The basic process for invalidating dynamically generated content is shown in FIG. 4. First, changes to a database are determined (4-2). Queries to be invalidated are then identified through analysis of those database changes (4-4). Cached content related to the queries is then determined (4-6), and invalidation messages are sent to caches or web servers that contain the cached content (4-8). Depending on the implementation, tasks 4-4 and 4-6 may be performed concurrently. The focus of the preferred embodiments described herein is the implementation of the first two tasks, namely determining the database changes to be acted upon, and identifying queries to be invalidated.

While it is possible to identify exactly those queries that are stale in view of current database contents, the main objective of invalidation is to prevent users from receiving out-of-date information, and thus it is permissible in accordance with the invalidation approach to invalidate a larger portion of the cache then would be strictly necessary to eliminate only that content affected by an update. This is referred to herein as over-invalidation. The permissibility of over-invalidation enables balancing of the system resources dedicated to precisely determining necessary invalidations against the resources required to recreate unnecessarily invalidated pages. Accordingly, some of the preferred embodiments involve implementations that inherently produce some over-invalidation in order to simplify the invalidation process as a whole.

System Architecture of Preferred Embodiments

Figure 5:
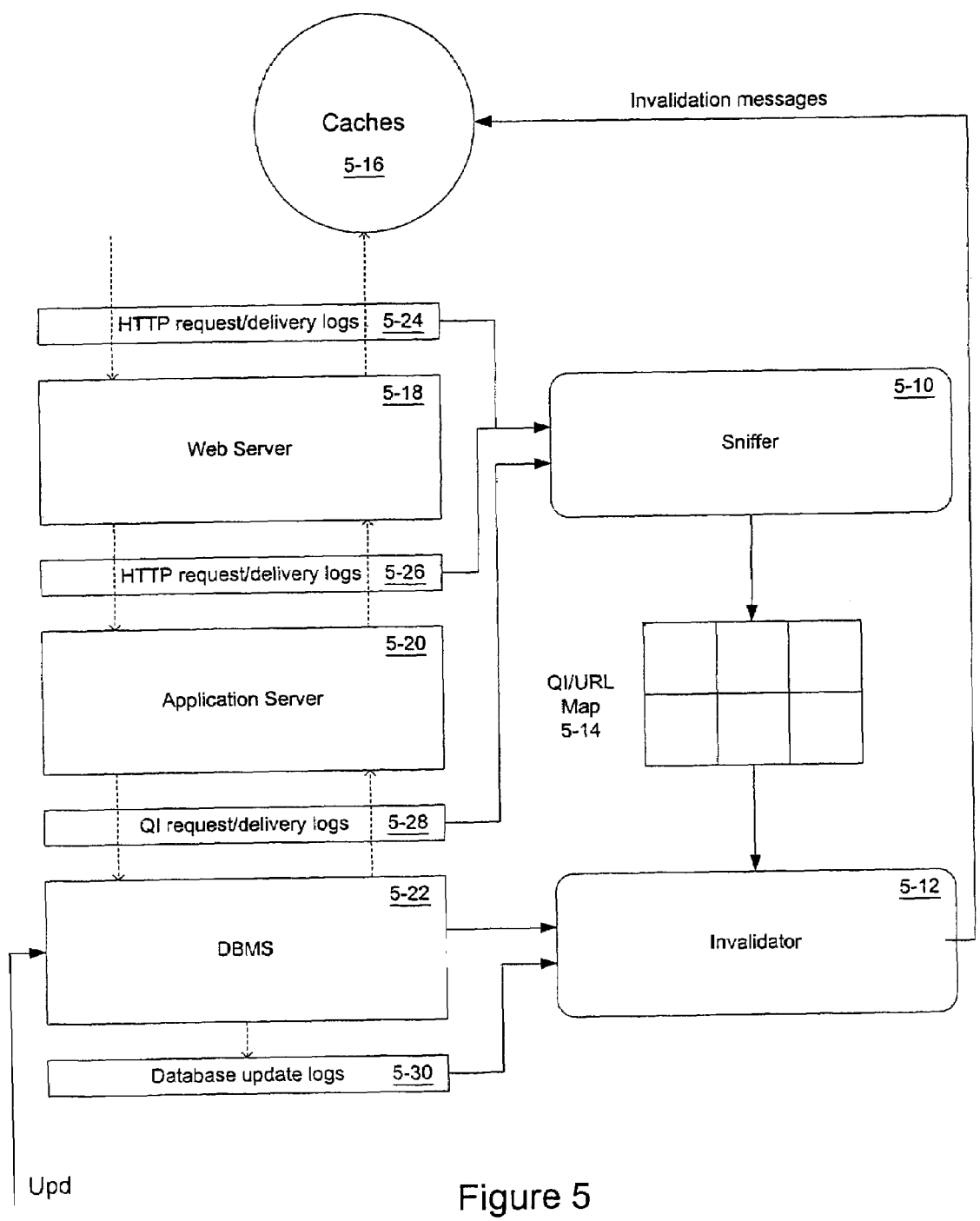
FIG. 5 shows an architecture of a content generation and delivery system in accordance with preferred embodiments of the invention.

FIG. 5 shows the architecture of a dynamic content caching, invalidation, and refreshing system according to the preferred embodiments of the invention. For purposes of the system architecture discussion, the following terms are defined:

Query type (QT): the definition of a query. It is a valid SQL statement that may or may not contain variables. A query type can be denoted as $Q(V_1, \ldots, V_n)$, where each $V_i$ is a variable that has to be instantiated by the application server before the query is passed to the DBMS.

Bound query type: a valid SQL statement that does not contain variables. A bound query type can be denoted as $Q(a_1, \ldots, a_n)$, where each $a_i$ is a value instantiated for variable $V_i$. Queries that are passed by the application server to the DBMS are bound queries.

Query instance (QI): a bound query type with an associated request timestamp. A bound query type can be denoted as $Q^t(a_1, \ldots, a_n)$, where t is the time at which application server passed the request to the DBMS. Therefore, multiple query instances may be of the same bound query type, and multiple bound query types may be of the same query type.

Figure 1:
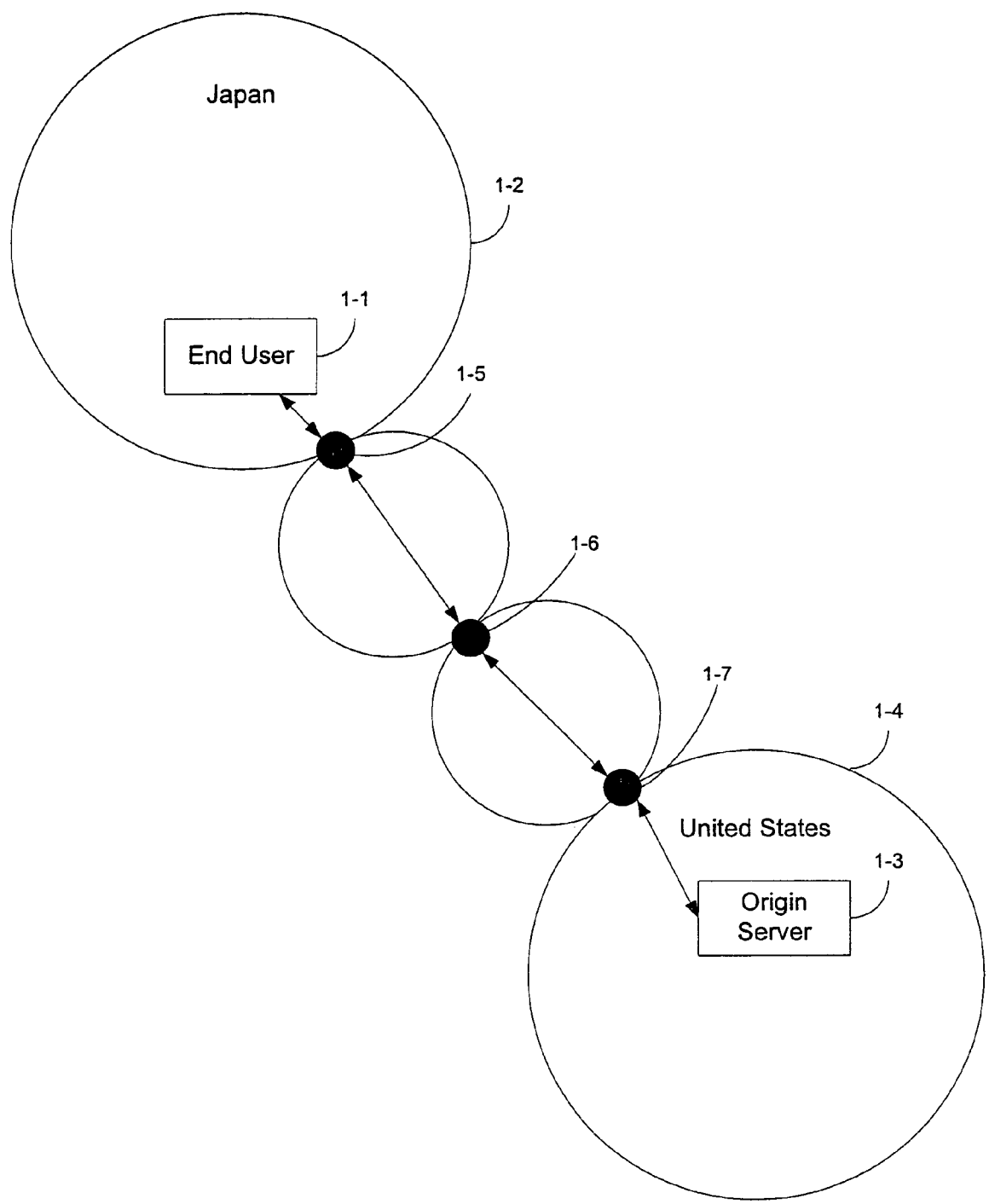
FIG. 1 shows a path of a file between a web site and a user.
Figure 2:
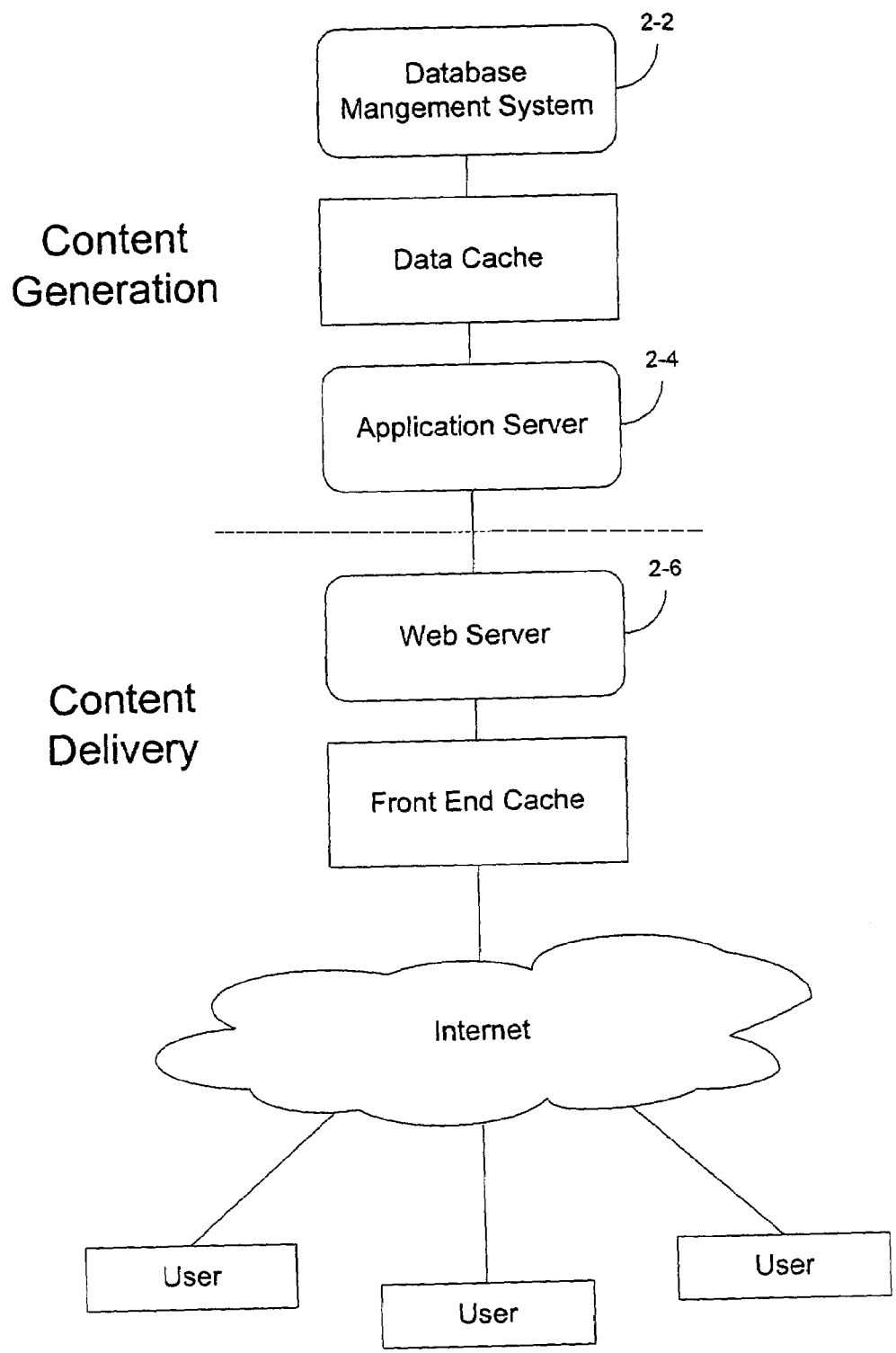
FIG. 2 shows the architecture of a conventional content generation and delivery system.

The system architecture includes a conventional web server 5-18, application server 5-20, and DBMS 5-22 as illustrated in FIG. 2, and further includes a sniffer 5-10 and an invalidator 5-12. The architecture of the system is designed such that little or no change is required to conventional components employed as web server 5-18, application server 5-20, or the DBMS 5-22. However, in preferred embodiments, cooperation from these entities can improve the performance of the architecture.

The sniffer 5-10 is a hardware or software device that can be placed on a network, such as an Ethernet through which the web server 5-18, application server 5-20, and DBMS 5-22 communicate, to monitor to network traffic. The sniffer 5-10 determines mapping of URL/cookie/post data to query instances (QI), using information from HTTP request/delivery logs 5-24, 5-26 and from a query instance ((QI)) request/delivery log 5-28, and stores query instance ((QI)) mapping information data to a query instance map (referred to herein as a QI/URL map) 5-14. The URL/cookie/post data may be collected at the input to the web server 5-18 by monitoring incoming HTTP requests. Alternatively, the URL/cookie/post data may be collected at the input to the application server 5-20 using environment variables set by the application server. For example, URL information can be collected using the HTTP_HOST environment variable followed by the QUERY_STRING, cookie information can be collected using the HTTP_COOKIE environment variable, and post data information can be collected using the HTTP message body.

The invalidator 5-12 uses information from a database update log 5-30, the QI/URL map 5-14, and sometimes the DBMS 5-22, to determine dynamically generated content to be invalidated based on identification of corresponding queries using various query identification schemes described herein.

Figure 6:
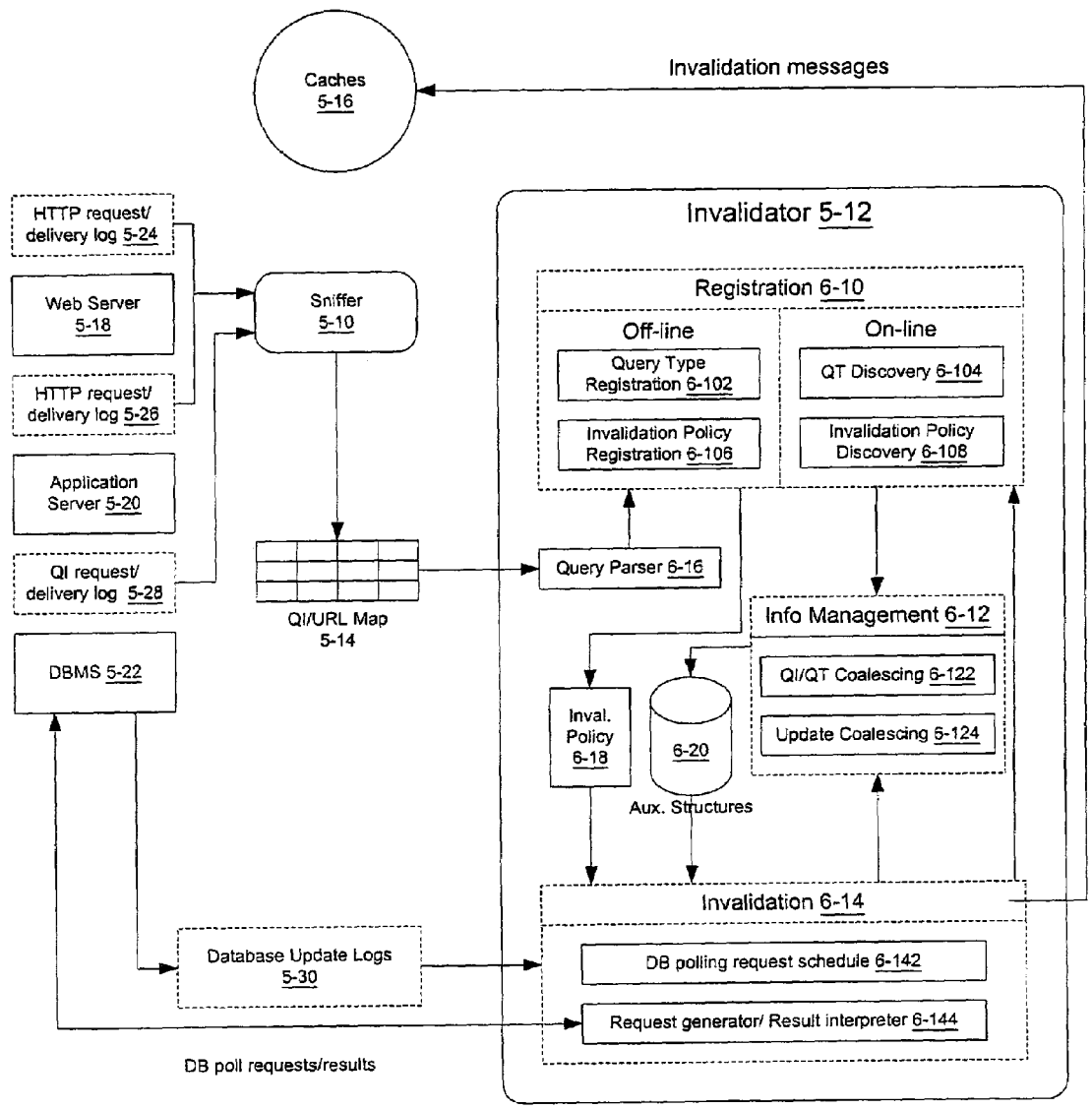
FIG. 6 shows details of an invalidator of FIG. 5 in accordance with preferred embodiments of the invention.

As illustrated in FIG. 6, the invalidator 5-12 consists of three modules: a registration module 6-10, an information management module 6-12, and an invalidation module 6-14.

The registration module 6-10 is responsible for invalidation policies and query types that are used in the invalidator. The registration module includes sections for managing this information in on-line and off-line modes.

The query type definitions produced by the registration module 6-10 are used to detect query types for purposes of group invalidation of queries, as discussed below. Query types are defined in an off-line mode by a query type registration section 6-102 that allows a user such as a system administrator or web site application server designer to register query types to be detected by the invalidator. QTs can typically be defined manually because there are only a limited number of QTs that can be generated by the application server 5-20. When operating in an on-line mode, a query type discovery process is performed by a QT registration section 6-104 that monitors the QI/URL map 5-14 by way of a query parser 6-16 and registers new QTs for any QIs that it cannot associate with known query types. For example, if the QT type registration section 6-104 observes the following three query instances in the log:

```
select maker, model, price
from car
where maker = "Toyota";
select maker, model, price
from car
where maker = "Honda";
select maker, model, price
from car
where maker = "Ford";
then the following query type is generated:
select maker, model, price
from car
where maker = $var;
```

Query types may be stored in auxiliary data structures 6-20.

The registration module 6-10 also manages invalidation policies and store invalidation policies in an invalidation policy storage 6-18. Invalidation policies may be created manually in an off-line mode using an invalidation policy registration section 6-106. In an on-line mode, an invalidation policy discovery section 6-108 dynamically create query statistics and creates and updates invalidation policies. An example of an invalidation policy is "cache and invalidate only the 100 most frequently accessed pages." Other parameters that may be considered in invalidation policy creation may include database polling frequency (i.e. access to the database with the purpose of gathering extra information that may be needed in the invalidation process), join index size, the frequency of join index maintenance, and the like, as described herein. For example, a join index may initially be created for a particular query, but over time, the invalidation policy discovery section 6-108 may determine that the update frequency of that join index is to high to warrant maintaining the join index.

The information management module 6-12 creates auxiliary data structures 6-20 that the invalidation module 6-14 uses in identifying queries to be invalidated. A QI/QT coalescing section 6-122 determines QIs that have relationships that allow them to be invalidated as a group. Examples include group invalidation of queries of a common type, and group invalidation through the use of query lattices, each of which is described in detail below. An update coalescing section 6-124 determines database updates that have relationships that allow them to be processed as a group. For example, range updates may be processed collectively as described below.

The invalidation module 6-14 identifies queries to be invalidated and sends invalidation messages to caches containing corresponding content. The invalidation module 6-14 monitors database update logs and polls the DBMS 5-22 to obtain information used for invalidation determinations. The invalidation module 6-14 includes a database polling request schedule section 6-142 that schedules database polling requests in accordance with the invalidation policies 6-18 and auxiliary data structures 6-20. A request generator/result interpreter section 6-144 sends polling queries and interprets polling query results.

The invalidation section 6-14 also sends invalidation messages to the appropriate cache 5-16 or web server 5-18, passes update information to the information management module 6-12 unit for the creation of auxiliary data structures 6-20, and passes update information to the registration module 6-10 for the revision of invalidation policies 6-18.

Identification of Individual Queries to be Invalidated

The basic process for identifying a query whose dynamically generated content must be invalidated as a result of a database update (i.e. an addition, alteration or deletion of a database tuple) involves determining whether the query is satisfied by a tuple affected by an update. To illustrate, consider the example presented above, in which a user request generated the query:

```
select maker, model, price
from car
where maker = "Toyota"
``` which utilizes data from the relations

```
car(maker, model, price), and
mileage(model, EPA)
``` to dynamically generate a page showing prices of Toyota models, which was then cached. Subsequently, the relation car was updated to include the new tuple (Toyota, Avalon, 25000).

To determine whether the cached page generated by the query should be invalidated, the affected tuple is applied to the query to determine whether the tuple satisfies the query. In this example, the new tuple satisfies the query because the query asks for information regarding any automobile made by Toyota. Accordingly, because the affected tuple satisfies the query, content generated by that query must be invalidated. It will be appreciated that this method is equally applicable where a tuple has been deleted or altered.

The foregoing example illustrates a simple case where the query involves data from only one relation. However, the process can be generalized to cases where the query involves data from more than one relation. For example, assume now that a user request generates the query:

```
select car.maker, car.model, car.price, mileage.EPA
from car, mileage
where car.maker = "Toyota" and car.model = mileage.model
``` in response to which the system generates and caches a page that provides price and mileage information for Toyota models in inventory. Assume further that after the page is cached, the relation car is updated to include the new tuple (Toyota, Avalon, 25000) as in the previous example, but that the relation mileage is not updated to include any Avalon mileage data.

In this example, the addition of the new tuple satisfies the first part of the query (car.maker="Toyota"), however, it is still necessary to determine whether the remaining portion of the query that involves relations other than the relation car is also be satisfied be data in those relations. In this instance, the query portion car.model=mileage.model is not satisfied by the data of the relation mileage because the relation mileage does not include a tuple for Avalon. This is determined by issuing the following polling query to the database:

```
select mileage.model, mileage.EPA
from mileage
where "Avalon" = mileage.model;
```

If the result set of the poll query is non-empty, then data of the relation mileage satisfies the remaining portion of the query, and thus the full query is satisfied and its corresponding content must be invalidated. However, in this example there is no Avalon tuple in the relation mileage, and so the result set of the poll query is empty, indicating that the corresponding page does not need to be invalidated.

In contrast, consider now a third example, in which a user generates the query:

```
select car.maker, car.model, car.price, mileage.EPA
from car, mileage
where car.maker = "Toyota" and car.price < 25000 and car.model = mileage.model
``` in response to which the system generates and caches a page that provides mileage information about the Toyotas in the inventory. Assume further that after the page is cached, the relation car is updated to alter the tuple (Toyota, Avalon, 25000) to the new tuple (Toyota, Avalon, 24000), and assume also that the relation mileage includes the tuple (Avalon, 28).

In this example, the updated Avalon tuple in the relation car satisfies the first part of the query (car.maker="Toyota" and car.price<25000), however, it is still necessary to determine whether the remaining portion of the query that involves relations other than the relation car is also be satisfied be data in those relations. In this instance, the query portion car.model=mileage.model is satisfied by the data of the relation mileage because the relation mileage includes a tuple for Avalon. This is determined by issuing the following polling query to the database:

```
select mileage.model, mileage.EPA
from mileage
where "Avalon" = mileage.model;
```

The result set of this poll query is non-empty, and so data of the relation mileage satisfies the remaining portion of the query, and thus the full query is satisfied and its corresponding content must be invalidated.

The process for determining whether an updated tuple satisfies a given query therefore involves two tasks:

determining whether the updated tuple satisfies the portion of the query that involves the updated tuple's relation, and if 1) is true, determining whether any other portion of the query that involves a relation other than the relation of the updated tuple is satisfied based on data currently stored in those other relations.

It will be appreciated from these examples that there is a trade-off between the amount of polling and processing required and the quality of the query invalidation process. For example, as an alternative to the processing in the second and third examples, the query could have been invalidated based only on the determination that the portion of the query involving the car relation was satisfied by the updated tuple. In the case of the second example, this approach would have led to invalidation of a query that in reality did not have to be invalidated, in other words, over-invalidation, while in the third example the invalidation would have been appropriate. This illustrates an example of an implementation in which a reduced amount of database polling is employed at the cost of a reduction of invalidation precision. Such an implementation may be desirable to optimize resource allocation in accordance with the real-time constraints of an e-commerce site.

Group Processing of Sets of Related Queries

To conserve processing resources, queries may be processed as groups, for example, assume that user requests produce the following queries A-C:

```
select car.maker, car.model, car.price
from car
where car.maker = "Toyota"
select car.maker, car.model, car.price
from car
where car.maker = "Nissan"
select car.maker, car.model, car.price
from car
where car.make = "Acura"
```

Three polling queries are required to process these three queries individually. However, these three queries may be represented by a single query type 1:

```
select car.maker, car.model, car.price
from car
where car.maker = $variable
```

Therefore the three queries may be invalidated collectively by invalidating the query type, in other words, by using the query type as the query to be invalidated. To do so, a query instance table query_type1 representing received queries of the type 1 is constructed:

| query_id | query_instance |
|----------|----------------|
| queryA   | Toyota         |
| queryB   | Nissan         |
| queryC   | Acura          |

Assume that the following updates have been made to the relation car:

```
(Acura, TL, 30000)
(Toyota, Avalon, 25000)
(Honda, Accord, 20000)
(Lexus, LS430, 54000)
```

To generate a list of queries of the query type 1 that need to be invalidated, the following polling queries are issued:

```
select query_type1.query_id
from query_type1
where "Acura" = query_type1.query_instance
select query_type1.query_id
from query_type1
where "Toyota" = query_type1.query_instance
select query_type1.query_id
from query_type1
where "Honda" = query_type1.query_instance
select query_type1.query_id
from query _type1
where "Lexus" = query_type1.query_instance
```

The results set generated by these polling queries will include queryA (Toyota) and queryC (Acura), indicating that cached content corresponding to these two queries must be invalidated.

In practice, this process may be implemented by issuing polling queries to query type tables for each database update reflected in an update log.

Group Processing of Sets of Related Updates

To further conserve resources, updates may be processed as groups. For example, assume again that the following four updates have been made to the relation car:

```
(Acura, TL, 30000)
(Toyota, Avalon, 25000)
(Honda, Accord, 20000)
(Lexus, LS430, 54000)
```

Assume further that these updates are stored temporarily in a table Delta. To invalidate the three queries:

```
select car.maker, car.model, car.price
from car
where car.maker = "Toyota"
select car.maker, car.model, car.price
from car
where car.maker = "Nissan"
select car.maker, car.model, car.price
from car
where car.make = "Acura"
``` the following corresponding polling queries are issued to table Delta:

```
select *
from Delta
where "Toyota" = Delta.maker
select *
from Delta
where "Nissan" = Delta.maker
select *
from Delta
where "Acura" = Delta.maker
```

A non-empty results set for any of these queries indicates that its corresponding query must be invalidated.

In practice, this process may be implemented by constructing the table Delta using updates reflected in the database update log.

Concurrent Group Processing of Queries and Updates

Group processing of sets of related queries and sets of related updates may be performed concurrently to realize further conservation of processing resources. Using the queries and updates of the two preceding examples, if it is assumed that the tables query_type1 and Delta have been constructed, then all of the queries of type 1 that need to be invalidated in view of the updates stored in table Delta may be identified by issuing the polling query:

```
select query_type1.query_id
from query_type1, Delta
where Delta.maker = query_type1.query_instance
```

The query IDs returned in response to this polling query identify the queries to be invalidated.

In practice, this process may be implemented by constructing update tables $Delta_{1, 2, \ldots n}$ for each relation in the database that has been updated using updates reflected in the database update log, and, for each query type, issuing polling queries to the corresponding query instance table and associated update tables.

Group Processing of Queries with Join Operations

Queries in which the instance to be selected from one relation depends on the instance selected from another relation (called a "join operation") may also be processed in groups. For example, assume that user requests have generated the following queries D and E:

```
select car.maker, car.model, car.price, mileage.EPA
from car, mileage
where car.maker = "Toyota"
and car.model = mileage.model
select car.maker, car.model, car.price, mileage.EPA
from car, mileage
where car.maker = "Ford"
and car.model = mileage.model
```

These queries may be represented by the following query type 2:

```
select car.maker, car.model, car.price, mileage.EPA
from car, mileage
where car.maker = $variable
and car.model = mileage.model
``` and may be represented in a query instance table query_type2 representing received queries of the type 2 as follows:

| query_id | query_instance |
|---|---|
| queryD | Toyota |
| queryE | Ford |

Assume further that the following four updates have been made to the relation car and are stored in a temporary table Delta:

```
(Acura, TL, 30000)
(Toyota, Avalon, 25000)
(Honda, Accord, 20000)
(Lexus, LS430, 54000)
```

To invalidate queries of the type 2 in view of these updates, the following single polling query may be issued:

```
select query_type2.query_id
from car, mileage, query_type2, Delta
where car.maker = delta.maker
and car.model = mileage.model
and delta.maker = query_type2.query_instance
```

In practice, this process may be implemented in the same manner as the concurrent group update and query processing described above, with the addition that polling queries may have to be issued directly to the database for relations that have not been updated but are referenced in join operations.

Group Invalidation of Sets of Related Queries Using Query Lattices

Range updates may update many similar tuples. An example of a range update is an operation to increase all the product prices in a database by five percent. To determine if associated queries need to be invalidated, the invalidator may detect and process each update individually. However, in the preferred embodiments, the invalidator treats all updates as an update to a single virtual table. In this section, techniques for reducing database polling are described, especially when a range query for update, insert, and delete DBMS operations is issued.

To illustrate, consider that the system has received two queries $qi_1$ and $qi_2$. Assume further that a condition specified in $qi_1$ implies a condition specified in $qi_2$ (expressed herein as $cond(qi_1) \rightarrow cond(qi_2)$, and that $qi_1$ has not been not invalidated yet. Under these circumstances, if $qi_1$ needs to be invalidated, then $qi_2$ also needs to be invalidated. Similarly, assume now that $cond(qi_2) \rightarrow cond(qi_1)$ and that $qi_1$ is not invalidated yet. Under these circumstances, if $qi_2$ needs to be invalidated, then $qi_1$ also needs to be invalidated.

This illustrates that query instance lattices can be formed that describe a partial order in which queries are to be invalidated. This concept can be generalized as follows. Assume that the invalidator/refresher has the following query type registered in the internal data structures:

$$QT = F^f_{AG}\Pi_{AP\sigma C}(R_1 \times \ldots \times R_N)[V_1, \ldots, V_M]$$

where σ is the selection operator, Π is the projection operator, F is the group-by operator, x is the Cartesian product operator, $R_i$s are the relations, C is the query condition, $V_j$s are the query variables/parameters, AP is the set of projection attributes, AG is the set of group-by attributes, and f is an aggregation function.

The set of all know query instances of this type can be denoted as a relation ($QITbl_{QT}$) with the following attributes:

| $QITbl_{QT} =$ | QID | $V_1$ | ... | $V_M$ | Req_time |
| --- | --- | --- | --- | --- | --- | where QID is the attribute in the table ($QITbl_{QT}$), M is the number of variables that form this query type, and the Req_time is the time stamp when the query was issued last time.

The set of all query instances (and their results) that have been executed and not yet invalidated can be formulated as follows:

$$F^f_{AG}\Pi_{APv\sigma C_v}(R_1 \times \ldots \times R_N \times QITbl_{QT}),$$

where $APv = AP \cup \{QID\}$, and $C_v$ is the condition C augmented such that each $V_i$ is replaced with the corresponding attribute name in $QITbl_{QT}$.

Query lattices can be categorized as positive and negative query lattices, as described below.

Group Processing of Queries Using Positive Query Lattices

Positive query lattices are a sequence of query conditions related by the "and" Boolean operator. Positive query lattices are an efficient mechanisms for determining when a database change will not affect a query, because when it is determined that one query is affected, then it is automatically known that any dependent queries in the lattice are affected and need not be checked.

Note that, in general, condition $C_v$ can be rewritten in a conjunctive normal form as follows:

$$C_v = C_1 \wedge \ldots \wedge C_c,$$

where $C_j$s are sub-conditions or sub-queries (aggregations used in the where clause etc.). Therefore, the query can also be rewritten as:

$$F^f_{AG}\Pi_{APv}(\sigma_{C1}(R_1 \times \ldots \times QITbl_{QT}) \cap \ldots \cap \sigma_{Cc}(R_1 \times \ldots \times QITbl_{QT})), \text{ or as}$$

$$F^f_{AG}\Pi_{APv}(\sigma_{C1}(R_1 \times \ldots \times QITbl_{QT}) \cap \ldots \cap \Pi_{APv\sigma Cc}(R_1 \times \ldots \times QITbl_{QT})).$$

Let $R_1(sync_1)$ denote the status of relation $R_1$ at $sync_1$. Then, the status of relation $R_1$ at $sync_2$ can be denoted as:

$$R_1(sync_2) = R_1(sync_1) + \Delta^+(R_1) - \Delta^-(R_1),$$

where $\Delta^+(R_1)$ is the new tuples added to the relation $R_1$ and where $\Delta^-(R_1)$ is the deleted tuples added to the relation $R_2$. Given a query instance with an ID equal to qid, if for all $C_j$s there is enough evidence to imply that:

$$qid \in \Pi_{QID\sigma Cj}(\Delta^+(R_1) \times \ldots \times QITbl_{QT}), \text{ or}$$

$$qid \in \Pi_{QID\sigma Cj}(\Delta^-(R_1) \times \ldots \times QITbl_{QT}),$$

then the query instance with the ID qid must be invalidated. Note that by keeping extra information, the semantics of the function f can be used to reduce the amount of over-invalidation. For instance, if the aggregation function is $avg(A_1)$, then if the value of $avg(A_1)$ and $count(AG)$ at $sync_1$ is known, then the value of $avg(A_1)$ at $sync_2$ can be determined using $\Delta^+(R_1)$ and $\Delta^-(R_1)$.

Let $Q = \{q_1, \ldots, q_n\}$ denote all query definitions. Then, $L_p(V_p, E_p)$ (positive query lattice) is a directed acyclic graph, where the vertices in $V_p$ correspond to queries (not necessarily in Q) and edges in $E_p$ correspond to invalidation relationships (between these queries) that are defined as follows:

if $q_i \rightarrow q_j \in E_p$, then if $qid \in q_i$, then $qid \in q_j$, either.

Therefore, positive query lattices can be used to propagate decisions of not-to-invalidate a query instance.

Figure 7:
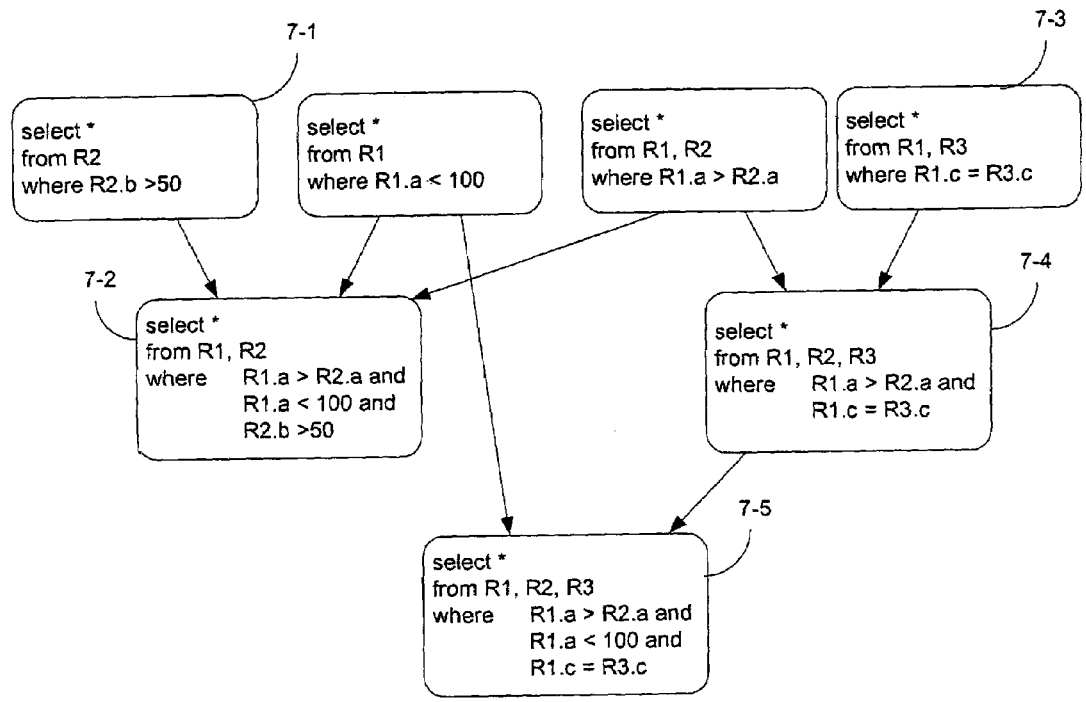
FIG. 7 shows a positive query lattice.

FIG. 7 shows an example positive query lattice. In this example, assume that it is known that an update will not affect the top-left query 7-1, select *
  from R2
  where R2.b>50.

Then, without further processing, it can be determined that the query 7-2, select *
  from R1,R2
  where R1.a>R2.a and
    R1.a>100 and
    R2.b>50 is also not affected by the update. Similarly, if query 7-3 is not affected by an update, then queries 7-4 and 7-5 are also not affected. In other instances, it may be determined that query 7-3 is affected but query 7-4 is not, in which case query 7-5 is also not affected.

Group Processing of Queries Using Negative Query Lattices

Negative query lattices are a sequence of query conditions related by the "or" Boolean operator. Negative query lattices are an efficient mechanism for determining when a database update will affect a query, because when one query in the lattice is determined to be affected, it is known that all dependent queries in the lattice are affected, and those queries need not be processed.

Note also that condition $C_v$ can be rewritten as:

$$C_v = C_1 \vee \ldots \vee C_c,$$

where $C_j$s are sub-conditions or sub-queries (aggregations used in the where clause etc.). In this case, the query can also be rewritten as:

$F^f_{AG}\Pi_{APv}(\sigma_{C1}(R_1 \times \ldots \times QITbl_{QT}) \cup \ldots \cup \sigma_{Cc}$
$(R_1 \times \ldots \times QITbl_{QT}))$, or as $F^f_{AG}\Pi_{Apv'}(\sigma_{C1}(R_1 \times \ldots \times QITbl_{QT}) \cup \ldots \cup \Pi_{Apv'\sigma Cc}$
$(R_1 \times \ldots \times QITbl_{QT}))$.

Then, if for any $C_j$, there is enough evidence to imply that:

qid $\in \Pi_{QID\sigma Cj}(\Delta^+(R_1) \times \ldots \times QITbl_{QT})$ or qid $\in \Pi_{QID\sigma Cj}(\Delta^-(R_1) \times \ldots \times QITbl_{QT})$, then the query instance with the ID qid must be invalidated.

Let $Q=\{q_1, \ldots, q_n\}$ denote all query definitions. Then, $L_n(V_n,E_n)$ (negative query lattice) is a directed acyclic graph, where the vertices in V correspond to queries (not necessarily in Q) and edges in $E_n$ correspond to invalidation relationships (between these queries) that are defined as follows:

if $q_i \to q_j \in E_n$, then if qid$\in q_i$, then qid$\in q_j$ too.

Therefore, negative query lattices can be used to propagate decisions to invalidate a query instance.

Figure 8:
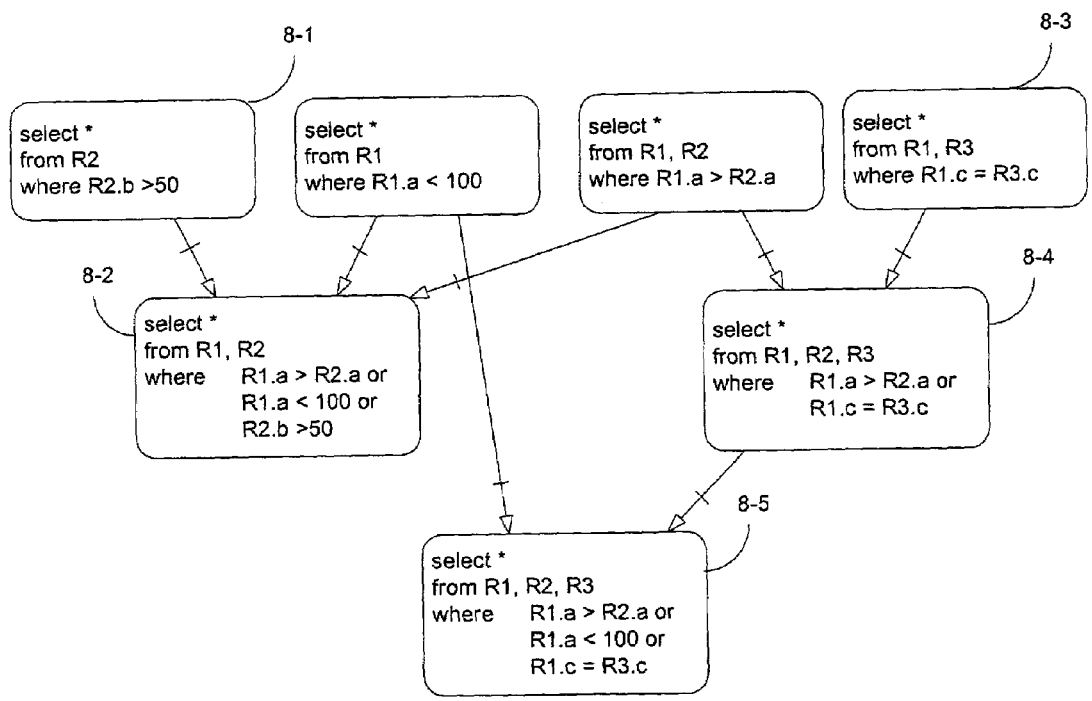
FIG. 8 shows a negative query lattice.

FIG. 8 shows an example of a negative query lattice. In this example, assume that it is known that an update affects the top-left query 8-1,
    select *
    from R2
    where R2.b>50.

Then, without further processing, we can determine that the query 8-2,
    select *
    from R1,R2
    where R1.a>R2.a or
       R1.a>100 or
       R2.b>50.

is also affected by the update. Similarly, if query 8-3 is affected by an update, then queries 8-4 and 8-5 are also affected by an update. There may also be instances where, query 8-3 is not affected by an update, but query 8-4 is affected by the update, and therefore query 8-5 is also affected by the update.

Invalidation Processing for Queries Involving Two Relations

This section illustrates techniques for invalidating queries in the relatively simple case of queries that involve only two relations. In later sections these techniques are generalized to larger numbers of relations.

Updates to a database system typically occur more frequently than processing to determine invalidation. Therefore, the effects of many updates on a given query must be evaluated.

Consider a query q that involves relations A and B. Such a query is represented as follows:

$q = A \bowtie B$

Figure 9:
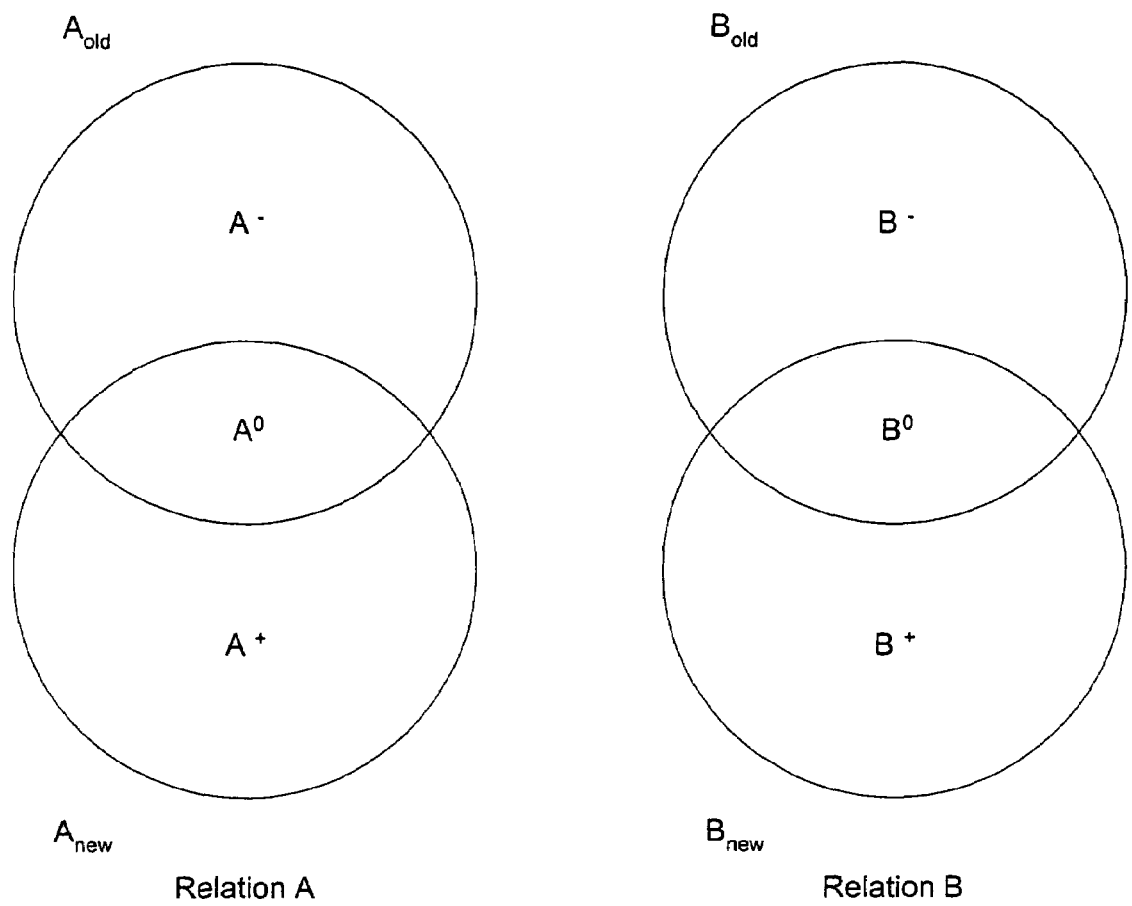
FIG. 9 shows changes occurring to relations over time as the result of updates.

For purposes of this example, it is assumed that updates to relations A and B constitute either inserts or deletions of tuples. Such updates are represented in FIG. 9. For the two relations A and B, $A^+$ and $B^+$ denote the sets of inserted tuples, $A^-$ and $B^-$ denote the sets of deleted tuples, and as $A^0$ and $B^0$ denote the tuples that do not change. Thus the results sets generated by the query before update and after updates may be expressed respectively as:

$A_{old} \bowtie B_{old}$ $A_{new} \bowtie B_{new}$

Each of these results sets can be expressed as components involving the aforementioned subsets of tuples in each relation, as follows:

$$A_{old} \bowtie B_{old} = (A^0 \cup A^-) \bowtie (B^0 \cup B^-)$$
$$= (A^0 \bowtie B^0) \cup (A^0 \bowtie B^-) \cup (A^- \bowtie B^0) \cup (A^- \bowtie B^-)$$
$$A_{new} \bowtie B_{new} = (A^0 \cup A^+) \bowtie (B^0 \cup B^+)$$
$$= (A^0 \bowtie B^0) \cup (A^0 \bowtie B^+) \cup (A^+ \bowtie B^0) \cup (A^+ \bowtie B^+)$$

Dynamically generated results responsive to the query must be invalidated if the query results produced from the updated relations are different than the query results produced from the relations prior to updating. Thus, any of the above components that involves an inserted or deleted tuple may be affected. Accordingly, the effect of a set of updates on the query may be evaluated by determining whether the following set of results is empty or non-empty for that query:

$(A^0 \bowtie B^+) \cup (A^+ \bowtie B^0) \cup (A^+ \bowtie B^+) \cup (A^0 \bowtie B^-)$
$\cup (A^- \bowtie B^0) \cup (A^- \bowtie B^-)$ This results set will be referred to herein as the "precise invalidation results set" because analysis of this results set provides a precise determination of whether the query must be invalidated so long as the database from which this set is calculated is not further updated during invalidation processing.

Snapshot-based Approach to Invalidation of Queries Involving Two Relations

A first processing scheme for invalidation of queries involving two relations is now described. This invalidation technique assumes that database snapshots both before the updates and after the updates are available to the invalidator, such that the invalidator has access to the relations before updates:

$A_{old} = A^0 \cup A^-$ and $B_{old} = B^0 \cup B^-$ and to the relations after updates:

$A_{new} = A^0 \cup A^+$ and $B_{new} = B \cup B^+$

This can be achieved either by delaying the updates to the relations and determining updates from the database update log, or by maintaining parallel versions of the database. The first option incurs additional load on the system, as it controls when the updates are reflected in the relations. While the second option does not have this overhead, it requires appropriate data structures and query processing capabilities embedded in the invalidator.

Figure 10:
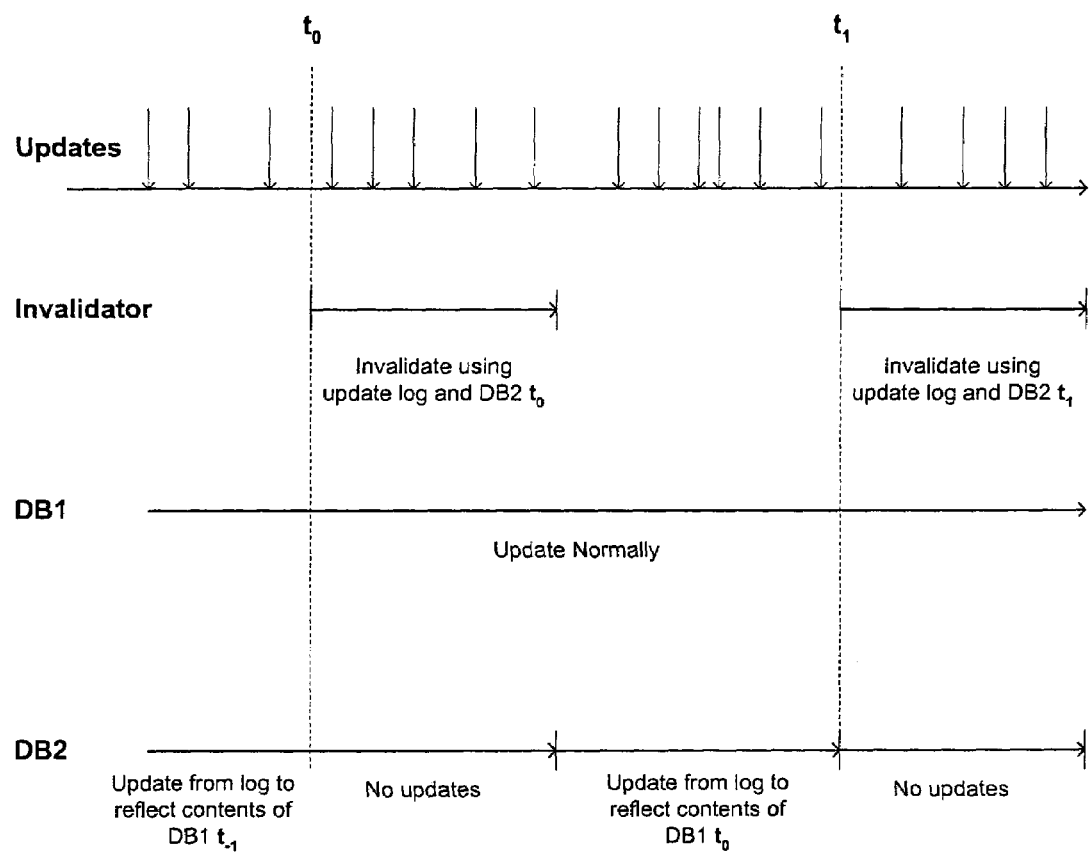
FIG. 10 shows an invalidation process in accordance with a first preferred embodiment.

Given the availability of old and new versions of the relations, the precise invalidation results set can be expressed as:

$((A^+ \bowtie B_{new}) \cup (A_{new} \bowtie B^+)) \cup ((A^- \bowtie B_{old}) \cup (A_{old} \bowtie B^-))$.

where the insertions $A^+$ and $B^+$ and the deletions $A^-$ and $B^-$ occurring within any given time period are determined from the database update log. This results set can be calculated in two stages involving separate processing of the deletions and the additions:

$(A^- \bowtie B_{old}) \cup (A_{old} \bowtie B^-)$ $(A^+ \bowtie B_{new}) \cup (A_{new} \bowtie B^+)$ FIG. 10 shows a basic invalidation processing scheme of the snap-shot approach where parallel copies of the relations are maintained. In FIG. 10, the notation DB1 designates a first version of the database that is updated normally and is used for generating dynamic content in response to queries, while DB2 designates a second version of the database in which updating is delayed by one invalidation cycle to provide snapshots of relations $A_{old}$ and $B_{old}$ that reflect the state of those relations as of the beginning of the preceding invalidation processing cycle. As shown in FIG. 10, an invalidation cycle begins at time $t_0$. The invalidation cycle involves sequential processing of a set of queries (e.g. query instances or query types) that may constitute some or all of the queries received by the system. The invalidation cycle bases its invalidation decisions on the contents of the contents of DB2 at $t_0$, which reflects the state of DB1 as of the beginning of the preceding update cycle, and the update log at $t_0$, which reflects all updates made to DB1 since the beginning of the preceding invalidation cycle. These together enable the determination of any non-empty results sets for each component of the precise invalidation results set as described above. During invalidation processing, no updates are made to DB2. After the invalidation cycle is complete, DB2 is updated from the update log to reflect the contents of DB1 as of the beginning of the preceding invalidation cycle. Thus, when the next invalidation cycle begins at time $t_1$, DB2 reflects all updates as of time $t_0$. While FIG. 10 specifically shows an implementation in which all updates are made to DB2 after invalidation processing is complete, in other embodiments invalidation processing and updating of DB2 may be done in an interleaved manner.

It is noted that this option may require four polling queries in order to invalidate one query. However, when the sizes of the updates are small, it is likely that calculating these four queries will be cheaper than recalculating the results of the query. Furthermore, processing of a query may be stopped as soon as a single tuple is found in the result of any of the polling queries.

It is also noted that this approach may be integrated with the group processing techniques described in previous sections to provide enhanced processing efficiency.

Synchronous Approach to Invalidation of Queries Involving Two Relations

A second processing scheme for invalidation processing is now described. In this scheme, the relations are locked at the beginning of the invalidation processing cycle, and, in contrast to the snapshot scheme, this scheme does not maintain old versions of the relations. As a result, $A_{old}$ and $B_{old}$ are not available for polling queries, and therefore the results set to be checked must be expressed only in terms of $A_{new}$ and $B_{new}$. This requires the substitution of $A_{new}=A^0 \cup A^+$ and $B_{new}=B^0 \cup B^+$ for the relations $A^0$ and $B^0$ used in the first scheme. When these terms are substituted into the precise invalidation results set, the resulting expression becomes:

$$(A_{new} \bowtie B^-) \cup (A^- \bowtie B_{new}) \cup (A^- \bowtie B^-) \cup (A_{new} \bowtie B^+) \cup (A^+ \bowtie B_{new}) \cup (A^+ \bowtie B^+)$$

However, as a result of the substitution, this results set differs from the precise invalidation results set in that it includes the additional component:

$$(A^- \bowtie B^+) \cup (A^+ \bowtie B^-)$$

This component is calculated inherently in determining the full results set expressed above, but, unlike the other components, a non-empty results set for this component does not indicate that the query must be invalidated. Therefore this scheme inherently produces over-invalidation whenever the results in a non-empty results set for a query are due solely to the above component. Such over-invalidation may be acceptable in some applications. In those in which it is not acceptable, the over-invalidation component may be calculated separately to determine whether it is the source of an invalidation result.

Figure 11:
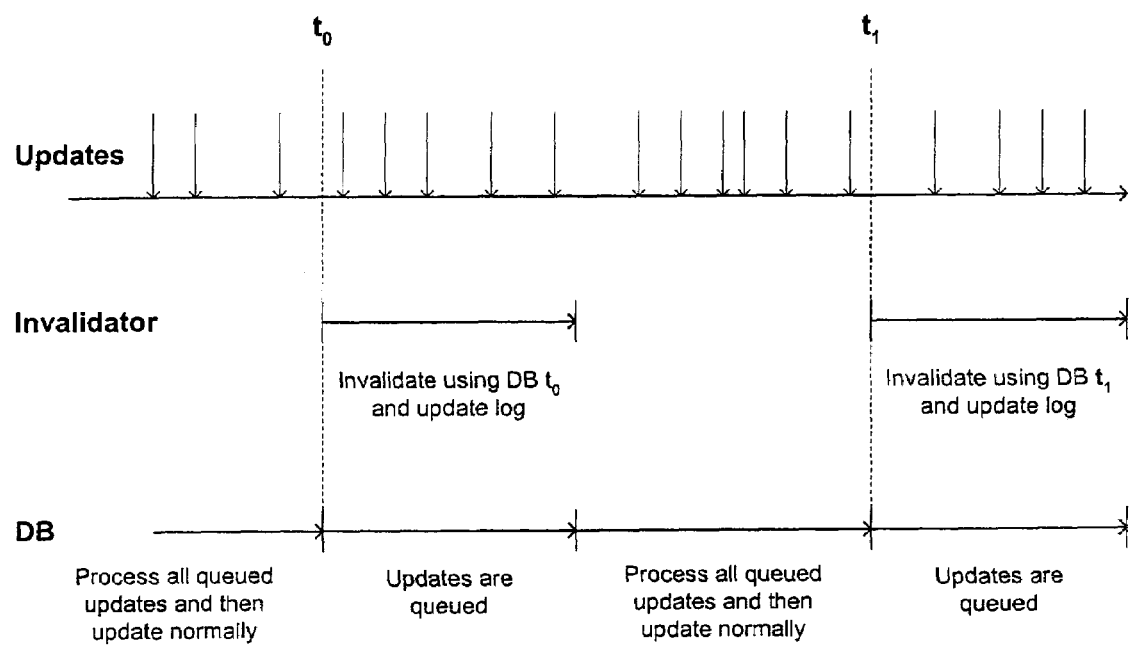
FIG. 11 shows an invalidation process in accordance with a second preferred embodiment.

FIG. 11 shows a basic invalidation processing scheme of the synchronous approach. In this scheme, an invalidation processing cycle occurs periodically, for example at times $t_0$ and $t_1$. At the beginning of each invalidation processing cycle, the database is locked to prevent updates, and all updates are queued. The locked database provides relations $A_{new}$ and $B_{new}$ for invalidation processing, and insertions $A^+$ and $B^+$ and deletions $A^-$ and $B^-$ that occurred in the database since the beginning of the last invalidation cycle are determined from the database update log. Thus for the invalidation cycle beginning at time $t_1$, the update log is used to determine the insertions $A^+$ and $B^+$ and deletions $A^-$ and $B^-$ that occurred in the database between times $t_0$ and $t_1$.

This invalidation processing scheme is may be undesirable in some applications because the locking of relations A and B during invalidation processing may induce additional load on the original database due to reduced availability.

Asynchronous Approach to Invalidation of Queries Involving Two Relations

A third processing scheme for invalidation processing is now described. In this scheme, the database is updated freely during invalidation processing. While this presents the fewest restrictions on the operation of the database, it may result in some over-invalidation.

Figure 12:
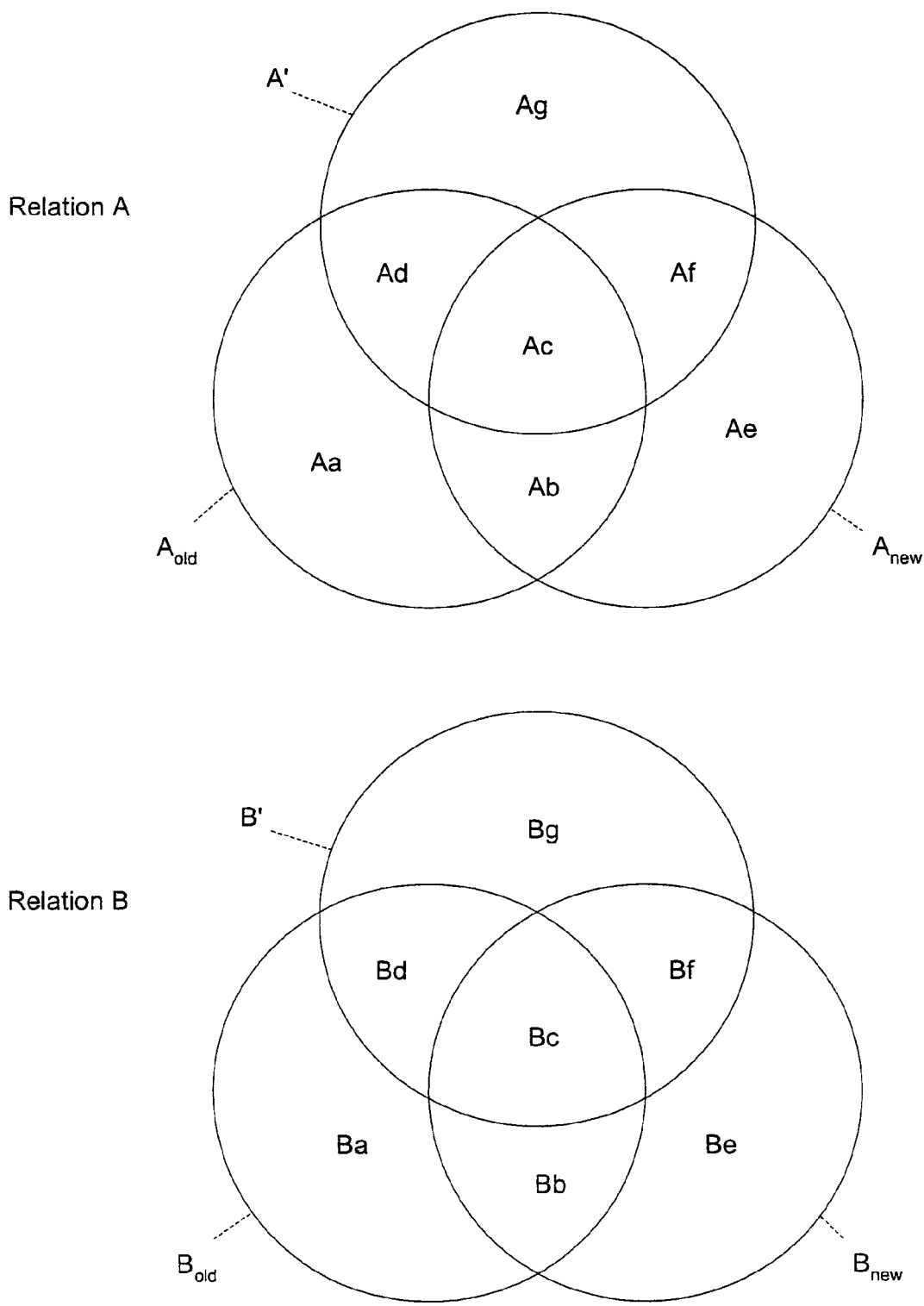
FIG. 12 shows changes occurring to relations over time as the result of updates.

FIG. 12 shows the states of the relations A and B that are relevant to this scheme. Referring to relation A, $A_{old}$ represents the state of relation A at the beginning of the previous invalidation processing cycle, and $A_{new}$ represents that state of the relation A beginning of the current invalidation cycle. Regions $A_a \cup A_d$ represents the deleted tuples $A^-$ and regions $A_e \cup A_f$ represent the inserted tuples $A^+$.

As noted above, in this scheme updating of the database continues during invalidation processing. This is illustrated in FIG. 12, in which updates that have occurred during the invalidation cycle as of the time of processing of a given query are represented by the area A'. It is noted that since queries are typically processed sequentially, rather than all at once, the contents of A' may be different at different times during invalidation processing. In particular, the region $A_b \cup A_e$ represents the tuples that are deleted during invalidation processing, and the region $A_d \cup A_g$ represents the tuples that are inserted during invalidation processing. Some of the tuples added during invalidation processing may be tuples that were deleted from $A_{old}$ to yield $A_{new}$. These are shown as $A_d$. Similarly, some of the tuples deleted during invalidation processing may be tuples that were added to $A_{old}$ to yield $A_{new}$.

Thus, to summarize, the three states of relation A that are relevant to processing in accordance with the present scheme may be expressed as:

$$A_{old}=A_a \cup A_b \cup A_c \cup A_d$$

$$A_{new}=A_b \cup A_c \cup A_e \cup A_f$$

$$A'=A_a \cup A_d \cup A_f \cup A_g$$

The insertions and deletions that represent the differences between $A_{old}$ and $A_{new}$ may be expressed as:

$$A^-=A_a \cup A_d$$

$$A^+=A_e \cup A_f$$

and the further insertions and deletions that are made to $A_{new}$ during invalidation processing may be expressed as:

$$\delta A^- = A_b \cup A_e$$

$$\delta A^+ = A_d \cup A_g$$

The corresponding components for relation B are expressed similarly.

At the instant that polling queries are being issued for a given query, the invalidator has access to $A^+$, $A^-$, $B^+$ and $B^-$, which are reflected in the locked update log, and $A'$ and $B'$, which are reflected in the actual database entries. When these terms are substituted into the expression of the precise invalidation results set, the expression becomes:

$$(A'\bowtie B^-) \cup (A^-\bowtie B') \cup (A^-\bowtie B^-) \cup (A' B+) \cup (A^+\bowtie B') \cup (A^+\bowtie B^+)$$

This results set differs from the precise invalidation results set in that it contains the additional component:

$$((A_d \cup A_f \cup A_g)\bowtie B^-) \cup (A^-\bowtie (B_d \cup B_f \cup B_g))$$

which produces over-invalidation when a query is invalidated as a result of a non-empty results set for this component.

The results set also differs from the precise invalidation results set in that it is missing the component:

$$(A_b\bowtie B^-) \cup (A^-\bowtie B_b)$$

The absence of this component can result in under-invalidation where a query is not invalidated but this component would produce a non-empty results set. This may be corrected by independently calculating this component and correcting the invalidation determinations accordingly. However, $A_b$ and $B_b$, which represent tuples added to the database prior to invalidation processing and then deleted during invalidation processing, are not reflected in either of the active database and the locked update log. Therefore the aforementioned component cannot be individually calculated for a current invalidation cycle. However, $A_b$ and $B_b$ will be available to the invalidator in the update logs during the following invalidation cycle. The $A_b$ and $B_b$ of a preceding invalidation cycle are designated here as $A_2^-$ and $B_2^-$. Accordingly, any under-invalidation occurring during a given invalidation cycle can be corrected in the next invalidation cycle by computing the results set for the component:

$$(A_b\bowtie B_2^-) \cup (A_2^-\bowtie B_b)$$

where $A_2^-$ and $B_2^-$ represent the $A_b$ and $B_b$ of the preceding invalidation cycle. Accordingly, the aforementioned component may be calculated in a given invalidation cycle for the previous invalidation cycle, and decisions of the preceding invalidation cycle may be adjusted accordingly. Note that while this correction will address any under-invalidation, it may cause further over-invalidation of cached results.

Figure 13:
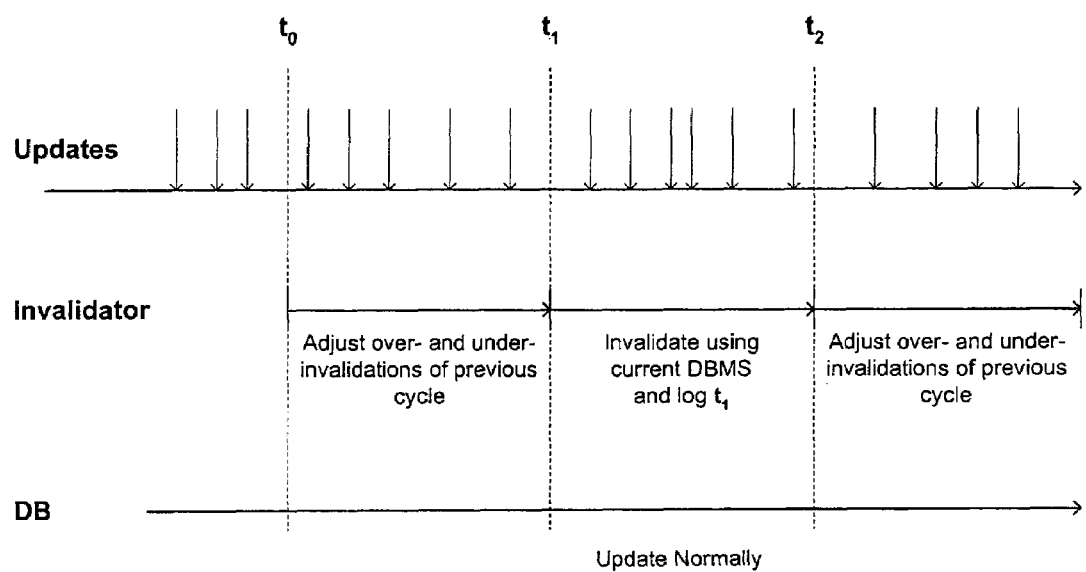
FIG. 13 shows an invalidation process in accordance with a third preferred embodiment.

FIG. 13 shows a basic invalidation processing scheme of the asynchronous approach. In this scheme, an invalidation processing cycle occurs periodically, for example at times to and $t_2$. Further, in the preferred embodiment of this scheme as illustrated in FIG. 13, invalidation processing is performed continuously, with each invalidation cycle including an invalidation portion and an adjustment portion, and with one cycle beginning at the conclusion of the previous cycle so that under-invalidations are corrected as soon as possible. For example, at the beginning of the invalidation processing cycle starting at time $t_0$, under-invalidations of the previous cycle are adjusted. When under-invalidation correction is complete, invalidation processing is performed using the actively updated database and the update log entries through time $t_1$. At the end of invalidation processing at time $t_2$, a new invalidation cycle begins with correction of under-invalidations of the previous cycle.

Invalidation of Queries with More than Two Relations

The approaches described above for queries involving two relations can be generalized to apply to queries involving any number of relations, as described in this section.

The query invalidation task will be described using the following concepts:

a database D that contains a set of relations $R= \{R_1, \ldots, R_n\}$ a set, $U(s)$, of updates (tuples deleted and inserted during the $s^{th}$ synchronization period) to these relations, yielding updated relations $$\{R^+_1, \ldots, R^+_n, \ldots, R^-_1, \ldots, R^-_n\}$$

a select-project-join query type QT of the form
$QT(V_1, \ldots, V_o) =$ select $a_1, \ldots, a_l$
from $r_1, \ldots, r_k$
where $\theta(V_1, \ldots, V_o)$, where $a_1, \ldots, a_l$ are the output attributes, $r_1, \ldots, r_k$ are the join relations in $\theta(V_1, \ldots, V_o)$ is a condition with query parameters, $V_1, \ldots, V_o$, and a set, $Q=\{q_i=<t_i,QT(V_1, \ldots, V_o), c_{i,1}, \ldots, C_{i,o}>\}$, of queries of type Q where $t_i$ is the time at which each query is processed, and $c_{i,1}, \ldots, c_{i,o}$ are the constants that are bound to the query parameters.

The invalidation process involves the determination of a set $Q^\Delta$ of queries that may have been affected by the updates. It was demonstrated above that where two relations are involved, the precise invalidation results set may be expressed as:

$$(A^0\bowtie B^+) \cup (A^+\bowtie B^0) \cup (A^+\bowtie B^+) \cup (A^0\bowtie B^-) \cup (A^-\bowtie B^0) \cup (A^-\bowtie B^-)$$

This set may also be expressed as:

$$[((A^-\cup A^0)\bowtie(B^-\cup B^0)) \cup ((A^+\cup A^0)\bowtie(B^+\cup B^0))] - (A^0\bowtie B^0)$$

Given a query q involving relations $R_1 \ldots R_n$, such that:

$$q = R_1\bowtie R_2\bowtie \ldots R_n$$

the precise invalidation results set can be generalized as:

$$[\bowtie^n_{i=1}(R^-_i\cup R^0_i)\cup[\bowtie^n_{i=1}(R^+_i\cup R^0_i)]]-\bowtie^n_{i=1}R^0_i$$

This results set has $2^{(n+1)}-2$ non-overlapping components: $2^n-1$ components result from $\bowtie^n_{i=1}(R^-_i\cup R^0_i)$ when the term $\bowtie^n_{i=1}R^0_i$ when the term $\bowtie^n_{i=1}R^0_i$ is excluded, and $2^n-1$ components result from $\bowtie^n_{i=1}(R^+_i\cup R^0_i)$ when the term $\bowtie^n_{i=1}R^0_i$ is excluded. The following sections describe processes for calculating the results set efficiently for the three approaches described above using two relations.

Snapshot-Based Approach to Invalidation of Queries Involving Multiple Relations

In the snapshot approach, the invalidator has access to old ($R_{oldi}$) and new ($R_{newi}$) versions of all relations ($R_i$). In that case the precise invalidation results set can be expressed as:

$$[(R^+_1\bowtie R_{new,2}\bowtie \ldots \bowtie R_{new,n})\cup \ldots \cup (R_{new,1}\bowtie \ldots \bowtie R^+_j\bowtie \ldots \bowtie R_{new,n})\cup \ldots \cup (R_{new,1}\bowtie \ldots \bowtie R_{new,n-1}\bowtie R^+_n)]\cup$$

$$[(R^-_1\bowtie R_{old,2}\bowtie \ldots \bowtie R_{old,n})\cup \ldots \cup (R_{old,1}\bowtie \ldots \bowtie R^-_j\bowtie \ldots \bowtie R_{old,n})\cup \ldots \cup (R_{old,1}\bowtie \ldots R_{old,n-1}\bowtie R^-_n)]$$

This set can be calculated in two stages, requiring 2×n queries, much less than $2^{n+1}-2$ queries required by a naive computation. As discussed above, calculation of the results set can be stopped as soon as a single result is generated.

Synchronous Approach to Invalidation of Queries Involving Multiple Relations

In the synchronous approach, a single version of the relations is maintained, and the relations are locked during invalidation processing. As described above in the case of two relations, this means that the invalidator does not have access to old versions of the relations $R_{old,i}$, and so the precise invalidation results set must be expressed entirely in terms of the new versions of the relations $R_{new,i}$, which introduces over-invalidation into the determination.

In the case of multiple relations, the expression:

$$\bowtie_{i=1}^{n} (R^+_i \cup R^0_i) - \bowtie_{i=1}^{n} R^0_i$$

can be rewritten using $R_{new,i}$ as:

$$[(R^+_1 \bowtie R_{new,2} \bowtie \ldots \bowtie R_{new,n}) \cup \ldots \cup (R_{new,1} \bowtie \ldots \\ \bowtie R^+_j \bowtie \ldots \bowtie R_{new,n}) \cup \ldots \cup (R_{new,1} \bowtie \ldots \\ \bowtie R_{new,n-1} \bowtie R^+_n)]$$

Therefore, that part of the results set can be calculated using $R_{new,i}$ without introducing any additional components. On the other hand, when the expression:

$$\bowtie_{i=1}^{n} (R^+_i \cup R^0_i) - \bowtie_{i=1}^{n} R^0_i$$

is rewritten using $R_{new,i}$, the resulting expression is:

$$[(R^-_1 \bowtie (R_{new,2} \cup R^-_2) \bowtie \ldots \bowtie (R_{new,1} \cup R^-_1)) \cup \ldots \\ \cup ((R_{new,1} \cup R^{-1}) \bowtie \ldots \bowtie R^-_j \bowtie \ldots \bowtie (R_{new,n} \cup \\ R_{-n})) \cup \ldots \cup ((R_{new,1} \cup R^{-1}) \bowtie \ldots \bowtie \\ (R_{new,n-1} \cup R^{-n-1}) \bowtie R^{-n}) \cup (R_{old,1} \bowtie \ldots \bowtie \\ R_{old,n-1} \bowtie R^{-n})]$$

This expression includes the additional term:

$$\bowtie_{i}^{n} (R^-_i \cup R^+_i) - (\bowtie_{i}^{n} R^-_i \cup \bowtie_{i}^{n} R^+_i)$$

which can be recovered by additional processing during invalidation processing. The expression also includes other over-invalidation components that cannot be recovered during invalidation processing because the involve relations $R^0_i$, which are not available (these components are always empty in the case of two relations).

Asynchronous Approach to Invalidation of Queries Involving Multiple Relations

In the asynchronous approach, the database is updated freely during invalidation processing, and only the update log is locked. For a given relation R as represented in FIG. 10, the three states of the relation R that are relevant to processing in accordance with the present scheme may be expressed as:

$$R_{old,i} = a_i \cup b_i \cup c_i \cup d_i$$

$$R_{new,i} = b_i \cup c_i \cup d_i \cup e_i$$

$$R'_i = c_i \cup d_i \cup f_i \cup g_i$$

The insertions and deletions that represent the differences between a given $R_{old}$ and $R_{new}$ may be expressed as:

$$R^-_i = a_i \cup d_i$$

$$R^+_i = d_i \cup e_i$$

and the further insertions and deletions that are made to a given $R_{new}$ during invalidation processing may be expressed as:

$$\delta R^-_i = b_i \cup e_i$$

$$\delta R^+_i = d_i \cup g_i$$

Substituting for these terms in the precise invalidation results set, the expression becomes:

$$(R^+_1 \bowtie (R'_2 \cup R^+_2) \bowtie \ldots \bowtie (R'_n \cup R^+_n)) \cup \ldots \\ \cup ((R'_1 \cup R^+_1) \bowtie \ldots \bowtie R^+_j \bowtie \ldots \bowtie (R'_n \cup R^+_n)) \\ \cup \ldots \cup ((R'_1 \cup R^+_1) \bowtie \ldots \bowtie (R'_{n+1} \cup \\ R^+_{n+1}) \bowtie R^+_n) \cup$$

$$(R^-_1 \bowtie (R'_2 \cup R^-_2) \bowtie \ldots \bowtie (R'_n \cup R^-_n)) \cup \ldots \\ \cup ((R'_1 \cup R^-_1) \bowtie \ldots \bowtie R^-_j \bowtie \ldots \bowtie (R'_n \cup R^-_n)) \\ \cup \ldots \cup ((R'_1 \cup R^-_1) \bowtie \ldots \bowtie (R'_{n+1} \cup \\ R^-_{n+1}) \bowtie R^-_n)$$

As described above in the case of two relations, this results set introduces an over-invalidation component and an under-invalidation component. This is the result of the use of $R'_i = (c_i \cup d_i \cup f_i \cup g_i)$ instead of $R^0_i = (b_i \cup c_i)$. Therefore, any component that involves $R^0_i$ uses the term $(d_i \cup f_i \cup g_i)$ instead of $b_i$. The missing bi causes under-invalidation, whereas the extra term $(d_i f_i \cup g_i)$ causes over-invalidation. In the case of queries involving two relations described above, postprocessing is used to correct under-invalidation. However, when there are more than two relations in the query, there always is a term $b_i$ that joins with a relation $R'_j$ among the under-invalidation terms. Since $R'_j$ will not be available at the next invalidation cycle, it is not possible to recover from under-invalidation using additional postprocessing.

While the embodiments described herein include various combinations of features, those features may characterize further embodiments of the invention individually or in other combinations, and thus it will be apparent to those having ordinary skill in the art that the system features and processing tasks described herein are not necessarily exclusive of other features and processing tasks, nor required to exist in only those combinations particularly described, but rather that further alternative combinations may be implemented and that additional features and tasks may be incorporated in accordance with particular applications. Therefore it should be understood that the embodiments described herein are offered by way of example only. The invention is not limited to these particular embodiment, but extends to various modifications, combinations, and permutations that fall within the scope and spirit of the appended claims.

What is claimed is:

1. In a system for producing dynamically generated content in response to user content requests that generate database queries, a method for invalidating dynamically generated content stored in caches of network devices, comprising:

receiving updates to a database of the system;

periodically performing processing on a set of received queries to identify queries for which corresponding dynamically generated content will be invalidated as a result of said updates; and sending invalidation messages to devices storing said corresponding content of said identified queries, wherein said processing comprises, for a given query Q, determining whether a results set is empty or non-empty, the results set consisting of the results:

$$[(R^+_1 \bowtie R_{new,2} \bowtie \ldots \bowtie R_{new,n}) \cup \ldots \cup (R_{new,1} \bowtie \ldots \\ \bowtie R^+_j \bowtie \ldots \bowtie R_{new,n}) \cup \ldots \cup (R_{new,1} \bowtie \ldots \\ \bowtie R_{new,n-1} \bowtie R^+_n)] \cup$$

$$[(R^-_1 \bowtie R_{old,2} \bowtie \ldots \bowtie R_{old,n}) \cup \ldots \cup (R_{old,1} \bowtie \ldots \\ R^-_j \bowtie \ldots \bowtie R_{old,n}) \cup \ldots \cup (R_{old,1} \bowtie \ldots \\ \bowtie R_{old,n-1} \bowtie R^-_n)]$$

where each $R_n$ is a relation involved in the query Q, each $R_{old,n}$ is a state of the relation $R_n$ as of the beginning of a preceding processing cycle, each $R_{new,n}$ is a state of the relation $R_n$ as of the beginning of the current processing cycle, each $R^-_n$ is a subset of tuples deleted from the relation $R_n$ since the beginning of a preceding processing cycle, and each $R^+_n$ is a subset of tuples added to the relation $R_n$ since the beginning of a preceding processing cycle, and only when said results sets is non-empty, designating said query Q as one of said identified queries.

2. A system for producing dynamically generated content in response to user content requests that generate database queries, comprising:

a database management system;

a web server for receiving user requests for dynamically generated content and for providing said dynamically generated content; and an application server coupled between the database management system and the web server for generating database polling queries corresponding to said requests and for supplying resulting data from the database to said web server, the system performing an invalidation method to invalidate dynamically generated content generated by said system and stored in caches of network devices, said method comprising:

receiving updates to the database management system;

periodically performing processing on a set of received queries to identify queries for which corresponding dynamically generated content will be invalidated as a result of said updates; and sending invalidation messages to devices storing said corresponding content of said identified queries, wherein said processing comprises, for a given query Q, determining whether a results set is empty or non-empty, the results set consisting of the results:

$$[(R^+_1 \bowtie R_{new,2} \bowtie \ldots \bowtie R_{new,n}) \cup \ldots \cup (R_{new,1} \bowtie \ldots \bowtie R^+_j \bowtie \ldots \bowtie R_{new,n}) \cup \ldots \cup (R_{new,1} \bowtie \ldots \bowtie R_{new,n-1} \bowtie R^+_n)]$$

$$[(R^-_1 \bowtie R_{old,2} \bowtie \ldots \bowtie R_{old,n}) \cup \ldots \cup (R_{old,1} \bowtie \ldots \bowtie R^-_j \bowtie \ldots \bowtie R_{old,n-1} \bowtie R_{old,n}) \cup \ldots \cup (R_{old,1} \bowtie \ldots \bowtie R^-_n)]$$

where each $R_n$ is a relation involved in the query Q, each $R_{old,n}$ is a state of the relation $R_n$ as of the beginning of a preceding processing cycle, each $R_{new,n}$ is a state of the relation $R_n$ as of the beginning of the current processing cycle, each $R^-_n$ is a subset of tuples deleted from the relation $R_n$ since the beginning of a preceding processing cycle, and each $R^+_n$ is a subset of tuples added to the relation $R_n$ since the beginning of a preceding processing cycle, and only when said results set is non-empty, designating said query Q as one of said identified queries.

3. In a system for producing dynamically generated content in response to user content requests that generate database queries, a method for invalidating dynamically generated content stored in caches of network devices, comprising:

receiving updates to a database of the system;

periodically performing processing on a set of received queries to identify queries for which corresponding dynamically generated content will be invalidated as a result of said updates; and sending invalidation messages to devices storing said corresponding content of said identified queries, wherein said processing comprises, for a given query Q, determining whether a results set is empty or non-empty, the results set consisting of the results:

$$[(R^+_1 \bowtie R_{new,2} \bowtie \ldots \bowtie R_{new,n}) \cup \ldots \cup (R_{new,1} \bowtie \ldots \bowtie R^+_j \bowtie \ldots \bowtie R_{new,n}) \cup \ldots \cup (R_{new,1} \bowtie \ldots \bowtie R_{new,n-1} \bowtie R^+_n)] \cup$$

$$[(R^-_1 \bowtie (R_{new,2} \cup R^-_2) \bowtie \ldots \bowtie (R_{new,1} \cup R^-_1)) \cup \ldots \cup ((R_{new,1} \cup R^-_1) \bowtie \ldots \bowtie R^-_j \bowtie \ldots \bowtie (R_{new,n} \cup R^-_n)) \cup \ldots \cup ((R_{new,1} \cup R^-_1) \bowtie \ldots \bowtie (R_{new,n-1} \cup R^-_{n-1}) \bowtie R^-_n) \cup (R_{old,1} \bowtie \ldots \bowtie R_{old,n-1} \bowtie R^-_n)]$$

where each $R_n$ is a relation involved in the query Q, each $R_{old,n}$ is a state of the relation $R_n$ as of the beginning of a preceding processing cycle, each $R_{new,n}$ is a state of the relation $R_n$ as of the beginning of the current processing cycle, each $R^-_n$ is a subset of tuples deleted from the relation $R_n$ since the beginning of a preceding processing cycle, and each $R^+_n$ is a subset of tuples added to the relation $R_n$ since the beginning of a preceding processing cycle, and only when said results set is non-empty, designating the query Q as one of said identified queries.

4. The method claimed in claim 3, wherein said processing further comprises adjusting said results set to account for the over-invalidation term:

$$\bowtie^n_i (R^-_i \cup R^+_i) - (\bowtie^n_i R^-_i \cup \bowtie^n_i R^+_i)$$

5. A system for producing dynamically generated content in response to user content requests that generate database queries, comprising:

a database management system;

a web server for receiving user requests for dynamically generated content and for providing said dynamically generated content; and an application server coupled between the database management system and the web server for generating database polling queries corresponding to said requests and for supplying resulting data from the database to said web server, the system performing an invalidation method to invalidate dynamically generated content generated by said system and stored in caches of network devices, said method comprising:

receiving updates to the database management system;

periodically performing processing on a set of received queries to identify queries for which corresponding dynamically generated content will be invalidated as a result of said updates; and sending invalidation messages to devices storing said corresponding content of said identified queries, wherein said processing comprises, for a given query Q, determining whether a results set is empty or non-empty, the results set consisting of the results:

$$[(R^+_1 \bowtie R_{new,2} \bowtie \ldots \bowtie R_{new,n}) \cup \ldots \cup (R_{new,1} \bowtie \ldots \bowtie R^+_j \bowtie \ldots \bowtie R_{new,n}) \cup \ldots \cup (R_{new,1} \bowtie \ldots \bowtie R_{new,n-1} \bowtie R^+_n)]$$

$$[(R^-_1 \bowtie (R_{new,2} \cup R^-_2) \bowtie \ldots \bowtie (R_{new,1} \cup R^-_1)) \cup \ldots \cup ((R_{new,1} \cup R^-_1) \bowtie \ldots \bowtie R^-_j \bowtie \ldots \bowtie (R_{new,n} \cup R^-_n)) \cup \ldots \cup ((R_{new,1} \cup R^-_1) \bowtie \ldots \bowtie (R_{new,n-1} \cup R^-_{n-1}) \bowtie R^-_n) \cup (R_{old,1} \bowtie \ldots \bowtie R_{old,n-1} \bowtie R^-_n)]$$

where each $R_n$ is a relation involved in the query Q, each $R_{old,n}$ is a state of the relation $R_n$ as of the beginning of a preceding processing cycle, each $R_{new,n}$ is a state of the relation $R_n$ as of the beginning of the current processing cycle, each $R^-_n$ is a subset of tuples deleted from the relation $R_n$ since the beginning of a preceding processing cycle, and each $R^+_n$ is a subset of tuples added to the relation $R_n$ since the beginning of a preceding processing cycle, and only when said results set is non-empty, designating the query Q as one of said identified queries.

6. The system claimed in claim 5, wherein said processing further comprises adjusting said results set to account for the over-invalidation term:

$$\bowtie^n_i(R^-_i \cup R^+_i) - (\bowtie^n_i R^-_i \cup \bowtie^n_i R^+_i)$$

7. In a system for producing dynamically generated content in response to user content requests that generate database queries, a method for invalidating dynamically generated content stored in caches of network devices, comprising:

receiving updates to a database of the system;

periodically performing processing on a set of received queries to identify queries for which corresponding dynamically generated content will be invalidated as a result of said updates; and sending invalidation messages to devices storing said corresponding content of said identified queries, wherein said processing comprises, for a given query Q, determining whether a results set is empty or non-empty, the results set consisting of the results:

$$(R^+_1 \cup (R'_2 \cup R^+_2) \bowtie \ldots \bowtie (R^-_j \bowtie \ldots \bowtie (R'_n \cup R^+_n))$$
$$\cup \ldots \cup ((R'_1 \cup R^+_1) \bowtie \ldots \bowtie R^+_j \bowtie \ldots$$
$$\bowtie (R'_n \cup R^+_n)) \cup \ldots \cup ((R'_1 \cup R^+_1) \bowtie \ldots$$
$$\bowtie (R'_{n-1} \cup R^+_{n-1}) \bowtie R^+_n) \cup$$

$$(R^-_1 \bowtie (R'_2 \cup R^-_2) \bowtie \ldots \bowtie (R'_n \cup R^-_n)) \cup \ldots$$
$$\cup ((R'_1 \cup R^-_1) \bowtie \ldots \bowtie (R'_n \cup R^-_n)) \cup \ldots$$
$$\cup ((R'_1 \cup R^-_1) \bowtie \ldots \bowtie (R'_{n-1} \cup R^-_{n-1}) \bowtie R^-_n)$$

where each $R_n$ is a relation involved in the query Q, each $R'_n$ is a state of the relation $R_n$ as of the time of processing of the query Q, each $R^-_n$ is a subset of tuples deleted from the relation $R_n$ since the beginning of a preceding processing cycle, and each $R^+_n$ is a subset of tuples added to the relation $R_n$ since the beginning of a preceding processing cycle, and only when said results, designating the query Q as one of said identified queries.

8. A system for producing dynamically generated content in response to user content requests that generate database queries, comprising:

a database management system;

a web server for receiving user requests for dynamically generated content and for providing said dynamically generated content; and an application server coupled between the database management system and the web server for generating database polling queries corresponding to said requests and for supplying resulting data from the database to said web server, the system performing an invalidation method to invalidate dynamically generated content generated by said system and stored in caches of network devices, said method comprising:

receiving updates to the database management system;

periodically performing processing on a set of received queries to identify queries for which corresponding dynamically generated content will be invalidated as a result of said updates; and sending invalidation messages to devices storing said corresponding content of said identified queries, wherein said processing is performed using said database, which is freely updated during said processing, and a portion of an update log of said database that reflects updates to the database made prior to the beginning of said processing.

9. The system claimed in claim 8, wherein said processing comprises:

determining whether respective results sets for subsets of said set of queries are empty or non-empty for tuples added to and deleted from said database since the beginning of a preceding processing cycle, using said freely updated database and said locked update log of said database; and for each non-empty results set, designating the queries of the corresponding subset as ones of said identified queries.

10. The system claimed in claim 9, further comprising, if a results set for a given query Q is non-empty, designating as identified queries one or more additional queries that are dependent from said query Q in a positive query lattice.

11. The system claimed in claim 9, further comprising, if a results set for a given query Q is non-empty, skipping processing of one or more additional queries that are dependent from said query Q in a negative query lattice.

12. The system claimed in claim 8, wherein a subset of said queries comprises queries represented by a common query type, and wherein processing of said subset comprises:

issuing polling queries to a query instance table of said query type for each of said updates; and designating query instances identified through said polling queries as said identified queries.

13. The system claimed in claim 8, wherein a subset of said queries comprises queries represented by a common query type, and wherein processing of said subset comprises:

issuing polling queries to a query instance table of said query type, and to update tables constructed from said update log and corresponding to relations utilized by queries of said query type, for each of said updates; and designating query instances identified through said polling queries as said identified queries.

14. The system claimed in claim 8, wherein a subset of said queries comprises queries represented by a common query type and including a join operation, and wherein processing of said subset comprises:

issuing polling queries to a query instance table of said query type, and to update tables constructed from said update log and corresponding to relations utilized by queries of said query type, and to relations of said database utilized by queries of said query type for which there have been no updates since the preceding invalidation cycle, for each of said updates; and designating query instances identified through said polling queries as said identified queries.

15. The system claimed in claim 8, wherein said processing further comprises correcting an under-invalidation of a preceding processing cycle.

16. A system for producing dynamically generated content in response to user content requests that generate database queries, comprising:

a database management system;

a web server for receiving user requests for dynamically generated content and for providing said dynamically generated content; and an application server coupled between the database management system and the web server for generating database polling queries corresponding to said requests and for supplying resulting data from the database to said web server, the system performing an invalidation method to invalidate dynamically generated content generated by said system and stored in caches of network devices, said method comprising:

receiving updates to the database management system;

periodically performing processing on a set of received queries to identify queries for which corresponding dynamically generated content will be invalidated as a result of said updates; and sending invalidation messages to devices storing said corresponding content of said identified queries, wherein said processing comprises, for a given query Q, determining whether a results set is empty or non-empty, the results set consisting of the results:

$(R^+_1 \bowtie (R'_2 \cup R^+_2) \bowtie \ldots \bowtie (R'_n \cup R^+_n)) \cup \ldots$
$\cup ((R'_1 \cup R^+_1) \bowtie \ldots \bowtie R^+_j \bowtie . \bowtie (R'_n \cup R^+_n))$
$\cup \ldots \cup ((R'_1 \cup R^+_1) \bowtie \ldots \bowtie R^-_j \bowtie \ldots$
$(R'_{n-1} \cup R^+_{n-1}) \bowtie R^+_n) \cup$ $(R^-_1 \bowtie (R'_2 \cup R^-_2) \bowtie \ldots \bowtie (R'_n \cup R^-_n)) \cup \ldots$
$\cup ((R'_1 \cup R^-_1) \bowtie \ldots \bowtie (R'_n \cup R^-_n)) \cup \ldots$
$\cup ((R'_1 \cup R^-_1) \bowtie \ldots \bowtie (R'_{n-1} \cup R^-_{n-1}) \bowtie R^-_n)$ where each $R_n$ is a relation involved in the query Q, each $R'_n$ is a state of the relation $R_n$ as of the time of processing of the query Q, each $R^-_n$ is a subset of tuples deleted from the relation $R_n$ since the beginning of a preceding processing cycle, and each $R^+_n$ is a subset of tuples added to the relation $R_n$ since the beginning of a preceding processing cycle, and only when said results set is non-empty, designating the query Q as one of said identified queries.

* * * * *